US009016700B2

(12) United States Patent
Murakami et al.

(10) Patent No.: US 9,016,700 B2
(45) Date of Patent: Apr. 28, 2015

(54) VEHICLE HEIGHT CONTROL DEVICE FOR MOTORCYCLE

(71) Applicant: Showa Corporation, Gyoda-shi (JP)

(72) Inventors: Yosuke Murakami, Fukuroi (JP); Tadashi Hachisuka, Fukuroi (JP); Kazuhiro Miwa, Fukuroi (JP)

(73) Assignee: Showa Corporation, Gyoda-shi (JP)

( * ) Notice: Subject to any disclaimer, the term of this patent is extended or adjusted under 35 U.S.C. 154(b) by 0 days.

(21) Appl. No.: 14/031,861

(22) Filed: Sep. 19, 2013

(65) Prior Publication Data

US 2014/0175764 A1   Jun. 26, 2014

(30) Foreign Application Priority Data

Dec. 21, 2012   (JP) ................................. 2012-280208

(51) Int. Cl.
| | |
|---|---|
| *B60K 25/06* | (2006.01) |
| *B60G 17/015* | (2006.01) |
| *B60G 17/017* | (2006.01) |
| *B62K 25/06* | (2006.01) |

(52) U.S. Cl.
CPC .............. *B60G 17/015* (2013.01); *B62K 25/06* (2013.01); *B60G 17/017* (2013.01); *B60G 2300/12* (2013.01); *B60G 2500/30* (2013.01)

(58) Field of Classification Search
CPC ................... B60G 2500/302; B60G 2400/252; B60G 17/048; B60G 2202/154; B60G 2202/15; B60G 2202/413; B60G 2202/416; B60G 17/044; B62K 25/06; F16F 9/325
USPC .................... 280/6.157, 5.514; 180/227, 219; 267/64.17; 188/322.2, 315, 322.19, 188/322.21
See application file for complete search history.

(56) References Cited

U.S. PATENT DOCUMENTS

| | | | | |
|---|---|---|---|---|
| 4,720,085 | A  * | 1/1988 | Shinbori et al. | ........... 267/64.16 |
| 5,009,451 | A  * | 4/1991 | Hayashi et al. | ........... 280/6.157 |
| 5,098,120 | A  * | 3/1992 | Hayashi et al. | ............... 267/276 |
| 5,101,923 | A  * | 4/1992 | Odagi et al. | .................. 180/219 |
| 5,181,696 | A  * | 1/1993 | Abe | ........................... 267/64.17 |
| 6,092,816 | A  * | 7/2000 | Sekine et al. | .............. 280/6.159 |
| 7,360,777 | B2 * | 4/2008 | Mizuno et al. | ......... 280/124.157 |
| 8,496,096 | B2 * | 7/2013 | Mochizuki | .................... 188/313 |
| 2001/0032462 | A1* | 10/2001 | Beck | ............................... 60/477 |
| 2008/0238017 | A1* | 10/2008 | Sandbulte et al. | ..... 280/124.157 |
| 2010/0294605 | A1* | 11/2010 | Mochizuki | .................... 188/297 |
| 2014/0077466 | A1* | 3/2014 | Murakami et al. | ......... 280/6.157 |

FOREIGN PATENT DOCUMENTS

| | | |
|---|---|---|
| JP | 61-033783 U | 3/1986 |
| JP | 02-031036 A | 2/1990 |
| JP | 02-129983 U | 10/1990 |

(Continued)

Primary Examiner — Karen Beck
(74) Attorney, Agent, or Firm — Leason Ellis LLP

(57) ABSTRACT

A damper is provided with a vehicle height control unit including: a jack housing of a hydraulic jack provided at an upper end portion of a vehicle body side tube such that a plunger which defines a jack chamber is fitted on the jack housing so as to be movable up and down; a suspension spring provided between the plunger and a wheel side tube; and a pump housing provided in an upper end portion of a damper cylinder and forming a pump chamber in a hydraulic pump such that a pump pipe forming a part of a piston rod and communicating with an oil chamber in the damper cylinder is slidably inserted into the pump chamber.

12 Claims, 15 Drawing Sheets

(56) References Cited

FOREIGN PATENT DOCUMENTS

| | | |
|---|---|---|
| JP | 04-034238 A | 2/1992 |
| JP | 08-022680 B | 3/1996 |
| JP | 2001-200880 A | 7/2001 |
| JP | 2010-084924 A | 4/2010 |

* cited by examiner

VEHICLE HEIGHT CONTROL DEVICE FOR MOTORCYCLE

CROSS-REFERENCE TO RELATED APPLICATIONS

This application is based on and claims priority under 35 U.S.C. 119 from Japanese Patent Application No. 2012-280208 filed on Dec. 21, 2012, the entire content of which is incorporated herein by reference.

BACKGROUND

1. Technical Field

The present invention relates to a vehicle height control device for a motorcycle.

2. Related Art

A motorcycle preferably has a low vehicle height at the time of stopping such that even short riders can set their feet easily on the ground, as this prevents the motorcycle from falling down. On the other hand, the vehicle height of the motorcycle needs to be relatively high during travel from the viewpoint of a bank angle, a shock absorbing capability, and the like. Furthermore, in some American model motorcycles, etc., riders desire the low vehicle height at the time of stopping in terms of appearance.

Thus, a vehicle height control device for a motorcycle has been proposed as described in JP-B-H8-22680. The vehicle height control device includes a damper tube provided on one of a vehicle body side and an axle side, a piston rod provided on the other of the vehicle body side and the axle side and sliding through an oil chamber in the damper tube to extend and contract with respect to the damper tube, a hydraulic jack provided on one side of the damper tube and the piston rod, a suspension spring interposed between a spring bearing supported by a plunger inserted into a jack chamber in the hydraulic jack and a spring bearing provided on the other side of the damper tube and the piston rod, a hydraulic pump performing a pumping operation in conjunction with extending and contracting motion of the piston rod with respect to the damper tube to feed oil in the oil chamber in the damper tube to the jack chamber in the hydraulic jack and to discharge oil from the jack chamber, and a selector valve which is closed to stop the hydraulic oil fed into the jack chamber in the hydraulic jack and which is opened to discharge the hydraulic oil. The vehicle height control device enables the vehicle height to be controlled by extending and contracting motion of the piston rod.

SUMMARY OF INVENTION

However, when a vehicle height control unit including a hydraulic jack, a hydraulic pump, and a selector valve is provided in a damper such as a front fork, the configuration of the damper needs to be significantly changed.

Furthermore, even when a vehicle speed decreases to a set value or smaller and then a vehicle height reducing operation is performed, if a vehicle is rapidly decelerated, the vehicle height control device may fail to sufficiently reduce the vehicle height within a short time until the vehicle stops.

Additionally, in a motorcycle with a pair of dampers disposed on respective laterally opposite sides of a vehicle body, when a vehicle height control unit (including a hydraulic jack, a hydraulic pump, and a selector valve) is provided in each of the dampers, the vehicle height control device involves a large occupied space, a heavy weight, and high costs.

An object of the present invention is to simply configure a damper provided with a vehicle height control unit.

Another object of the present invention is to provide a vehicle height control device that inevitably reduces the vehicle height when a vehicle stops so that rider's feet can appropriately touch the ground.

Yet another object of the present invention is to provide a motorcycle with a pair of dampers disposed on respective laterally opposite sides of a vehicle body, the motorcycle including a compact vehicle height control device.

[1] An aspect of the invention provides a vehicle height control device for a motorcycle with a pair of dampers disposed on laterally opposite sides of a vehicle body, the vehicle height control device including: a vehicle height control unit provided in at least one of the left and right dampers, in which the damper provided with the vehicle height control unit includes: a wheel side tube; a vehicle body side tube slidably engaged with the wheel side tube; a damper cylinder provided upright in an inner bottom portion of the wheel side tube; an oil chamber; a piston rod hanging from an upper end portion of the vehicle body side tube and inserted into the oil chamber in the damper cylinder; a piston provided at a leading end portion of the piston rod, the oil chamber being partitioned by the piston, into an upper oil chamber above the piston and a lower oil chamber below the piston; and an oil reservoir chamber defined outside the damper cylinder and spanning to an upper portion of the vehicle body side tube, the oil reservoir chamber having an upper portion that forms an air chamber, and in which the vehicle height control unit includes: a hydraulic jack including a jack housing and a plunger, the jack housing being provided at an upper end portion of the vehicle body side tube such that the plunger defining a jack chamber of the hydraulic jack is fitted on the jack housing so as to be movable up and down; a suspension spring provided between the plunger of the hydraulic jack and the wheel side tube; a hydraulic pump including a pump housing and a pump pipe, the pump housing being provided in an upper end portion of the damper cylinder and forming a pump chamber of a hydraulic pump such that the pump pipe forming a part of the piston rod and communicating with the oil chamber in the damper cylinder is slidably inserted into the pump chamber in the pump housing; a selector valve controlling a vehicle height by adjustment of an amount of hydraulic oil fed to the jack chamber in the hydraulic jack by the hydraulic pump that performs a pumping operation in conjunction with extending and contracting motion of the pump pipe with respect to the pump housing; and a control unit that opens or closes the selector valve in a controllable manner.

[2] The vehicle height control device for the motorcycle according to [1], may further include a detection unit that detects a height position of the plunger of the hydraulic jack, in which the control unit opens or closes the selector valve in a controllable manner according to a result of the detection by the detection unit.

[3] The vehicle height control device for the motorcycle according to [1] or [2], may have a configuration in which the selector valve is provided at an upper end portion of the vehicle body side tube.

[4] The vehicle height control device for the motorcycle according to any one of [1] to [3], may have a configuration in which the control unit predicts a stoppage predicted time of a vehicle, and when the predicted stoppage predicted time is equal to or less than a reference stoppage time, and the control unit enters a vehicle height reducing control mode to switch the selector valve, which enables a vehicle height reducing operation.

[5] The vehicle height control device for the motorcycle according to any one of [1] to [4], may have a configuration in which the vehicle height control unit is provided only in one of the left and right dampers.

[6] The vehicle height control device for the motorcycle according to [5], may have a configuration in which a suspension spring is provided in the other of the left and right dampers, and a spring load on the suspension spring provided in the one of the left and right dampers is set higher than a spring load on the suspension spring provided in the other of the left and right dampers.

[7] The vehicle height control device for the motorcycle according to [5], may have a configuration in which a suspension spring is not provided in the other of the left and right dampers.

[8] The vehicle height control device for the motorcycle according to [7], may have a configuration in which an amount by which the hydraulic jack provided in the one of the left and right dampers elevates and lowers is equivalent to double an amount by which the hydraulic jack elevates and lowers assuming a case that vehicle height control units are respectively provided in both the left and right dampers.

[9] The vehicle height control device for the motorcycle according to any one of [5] to [8], may have a configuration in which a main damping force generator is provided in the other of the left and right dampers, and in the one of the left and right dampers, the damping force generator is not provided or only an auxiliary damping force generator is provided.

With the configuration of [1], the damper provided with the vehicle height control unit can be simply configured.

With the configuration of [2], based on the result of the detection by the detection unit, the plunger of the hydraulic jack can be set to any height position, and thus the vehicle height can be adjusted to any height position.

With the configuration of [3], the selector valve formed of a solenoid or the like can be disposed at a sprung position above the suspension spring where an input of vibration is small.

With the configuration of [4], the vehicle height starts to be reduced during travel when the vehicle is about to stop. The vehicle height is completely reduced within a short time until the vehicle stops. This allows rider's feet to appropriately touch the ground, thus ensuring stability.

With the configuration of [5], this enables a reduction in the occupied space, weight, and costs of the vehicle height control device.

With the configuration of [6], this allows enhancement of the support capability of the suspension spring for the damper provided with the vehicle height control unit.

With the configuration of [7], this enables a reduction in the occupied space, weight, and costs of the vehicle height control device.

With the configuration of [8], the spring load on the suspension spring can be substantially doubled due to the deflection of the suspension spring caused by the provision of the vehicle height control unit and the suspension spring only in the one of the dampers.

With the configuration of [9], the main damping force generator is provided in the damper that is not provided with the vehicle height control unit. In the damper provided with the vehicle height control unit, the damping force generator is not provided or only the auxiliary damping force generator is provided. Hence, the left and right dampers can be balanced in weight.

DESCRIPTION OF EMBODIMENTS

Embodiment 1

FIG. 1 to FIG. 10

Figure 1:
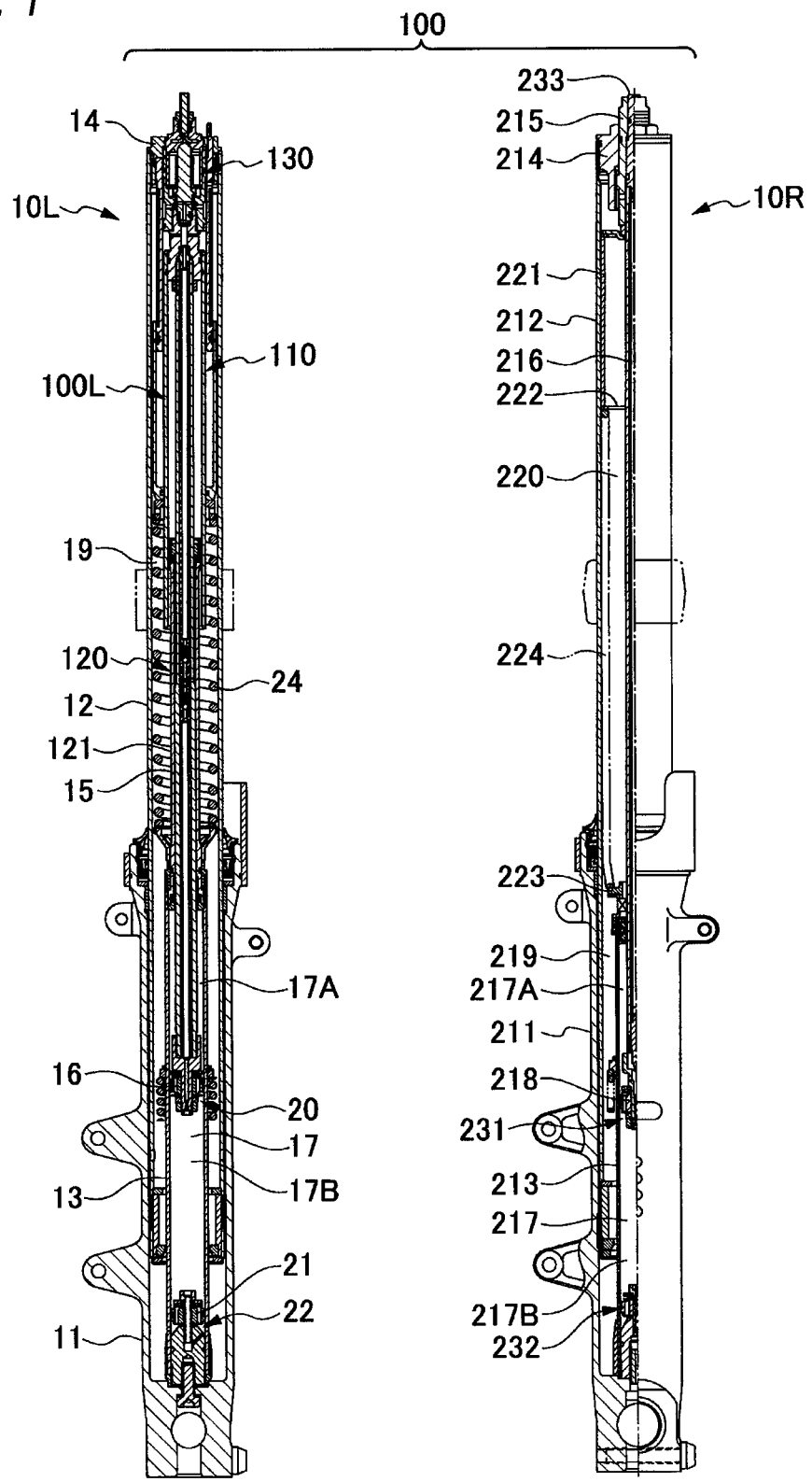
FIG. 1 is a cross-sectional view showing a left damper and a right damper included in a vehicle height control device according to Embodiment 1.
Figure 2:
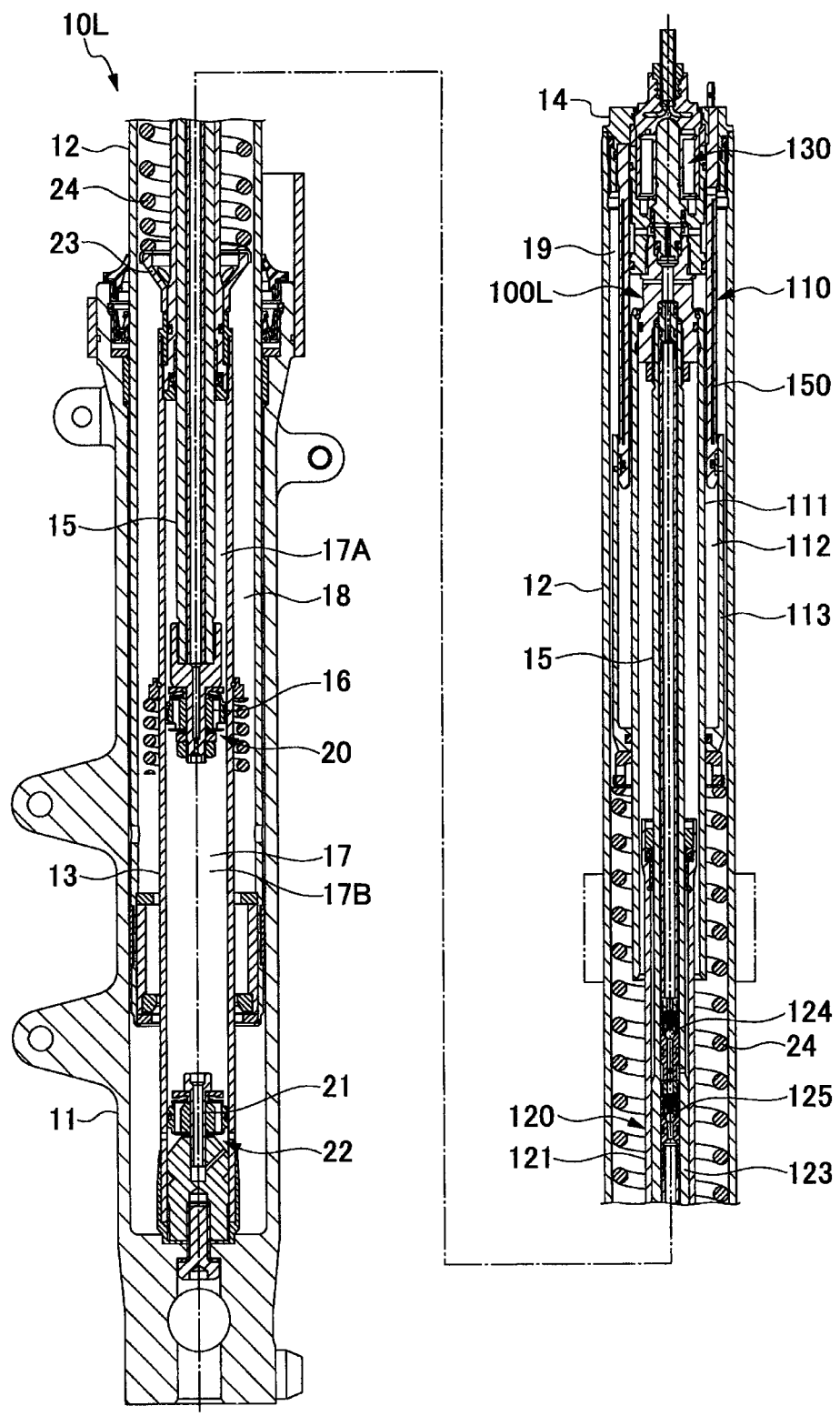
FIG. 2 is a cross-sectional view showing the damper.
Figure 3:
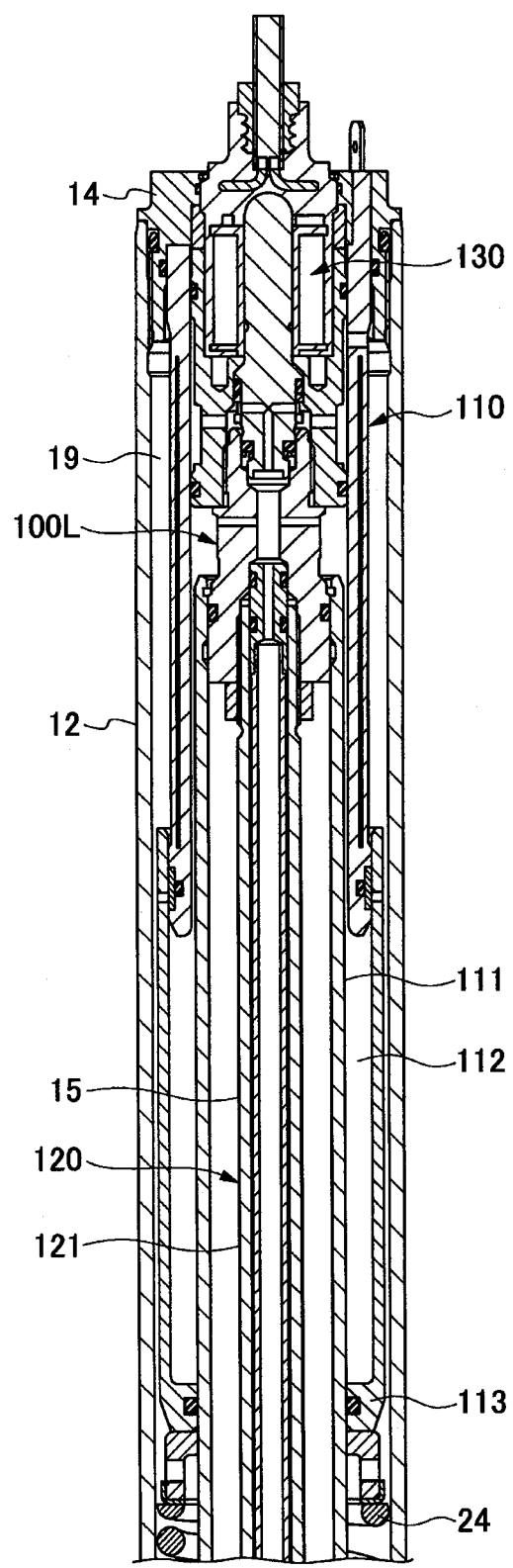
FIG. 3 is a cross-sectional view of an upper portion of the damper.

FIG. 1 shows a pair of dampers 10L and 10R disposed on a left side and a right side, respectively, of a vehicle so as to form a front fork of a motorcycle. In this case, in the motorcycle according to the present embodiment, a vehicle height control device 100 is configured by providing a vehicle height control unit 100L only in one of the left and right dampers, that is, the damper 10L. The damper 10L and the damper 100R will be described below in detail.

(Configuration of the Damper 10L) (FIG. 1 to FIG. 8)

The damper 10L includes a wheel side tube (outer tube) 11 located on a wheel side and which is closed at one end and which is open at the other end, and a vehicle body side tube (inner tube) 12 located on a vehicle body side and slidably inserted into the wheel side tube 11, so as to form an upright front fork, as shown in FIG. 1 to FIG. 4.

The damper 100L includes a damper cylinder 13 provided upright in an inner bottom portion of the wheel side tube 11. A cap bolt 14 is threaded in an upper end portion of the vehicle body side tube 12. A jack housing 111 of a hydraulic jack 110 described below is attached to the cap bolt 14. A piston rod 15 is attached to a lower portion of the jack housing 111. The piston rod 15 hangs from an upper end portion of the vehicle body side tube 12 and extends through a pump housing 121 fixed as described below to an upper end portion of the damper cylinder 13 into an oil chamber 17 inside the damper cylinder 13. The oil chamber 17 is partitioned by a piston 16 provided at a leading end portion of the piston rod 15 into an upper oil chamber 17A above the piston 16 and a lower oil chamber 17B below the piston 16.

The damper 10L includes an oil reservoir chamber 18 defined outside the damper cylinder 13 and spanning to an upper portion of the vehicle body side tube 12. An air chamber 19 is located above the oil reservoir chamber 18.

The damper 10L includes a damping force generator 20 provided in a communication path formed in the piston 16 and through which the upper oil chamber 17A and the lower oil chamber 17B are in communication with each other. The damper 10L also includes a base piston 21 in a bottom portion of the damper cylinder 13 and a damping force generator 22 provided in a communication path formed in the base piston 21 and through which the upper oil chamber 17A and the oil reservoir chamber 18 are in communication with each other, and this communication path compensates for the volume of the piston rod 15, which advances into and retracts from damper cylinder 13. The damping force generator 20 generates an extension side damping force, and the damping force generator 22 generates a compression side damping force.

The damper 10L includes a suspension spring 24 provided between a plunger 113 of a hydraulic jack 110 described below and the wheel side tube 11, and in the present embodiment, between the plunger 113 of the hydraulic jack 110 and a spring bearing 23 provided at the upper end portion of the damper cylinder 13 provided upright in the wheel side tube 11. Thus, the damper 10L buffers an impact force applied by a road surface by means of the spring force of the suspension spring 24 and the spring force of the air chamber 19. The compression- and extension side damping forces generated by the damping force generators 20 and 22 damp stretching vibration involved in absorption of the impact force by the suspension spring 24 and the air chamber 19.

Now, the vehicle height control unit 100L will be described in detail which is provided only in one of the left and right dampers, that is, the damper 10L, in order to configure the vehicle height control device 100.

(Vehicle Height Control Unit 100L of the Vehicle Height Control Device 100) (FIG. 2 to FIG. 8)

The vehicle height control unit 100L includes the jack housing 111 of the hydraulic jack 110 provided in the upper end portion of the vehicle body side tube 12 such that the plunger 113 defining a jack chamber 112 in the hydraulic jack 110 is fitted on the jack housing 111 so as to be movable up and down.

The jack housing 111 of the hydraulic jack 110 includes an upper jack housing 111A provided around a valve housing 131 for a selector valve 130 attached to the cap bolt 14 and described below, a lower jack housing 111B connected to a lower portion of the upper jack housing 111A, and an outer jack housing 111C connected to an outer periphery of the upper jack housing 111A and extending around the lower jack housing 111B.

The plunger 113 of the hydraulic jack 110 is formed of a cylinder sliding, in a liquid tight manner, around an outer periphery of the outer jack housing 111C and the lower jack housing 111B of the jack housing 111. A blow hole 114 is formed on an upper end side of the plunger 113 so that when the plunger 113 lowers from the jack housing 111 to a maximum projecting end, hydraulic oil in the jack chamber 112 is let out into the oil reservoir chamber 18 through the blow hole 114.

The damper 10L includes a pump housing 121 provided in the upper end portion of the damper cylinder 13 and forming a pump chamber 122 of the hydraulic pump 120. A pump pipe 123 formed of the hollow piston rod 15 and communicating with the oil chamber 17 in the damper cylinder 13 is slidably inserted into the pump chamber 122 in the pump housing 121. In the present embodiment, an annular space between the pump housing 121 and an outer-peripheral reduced diameter portion of the piston rod 15 forms the pump chamber 122.

Figure 4:
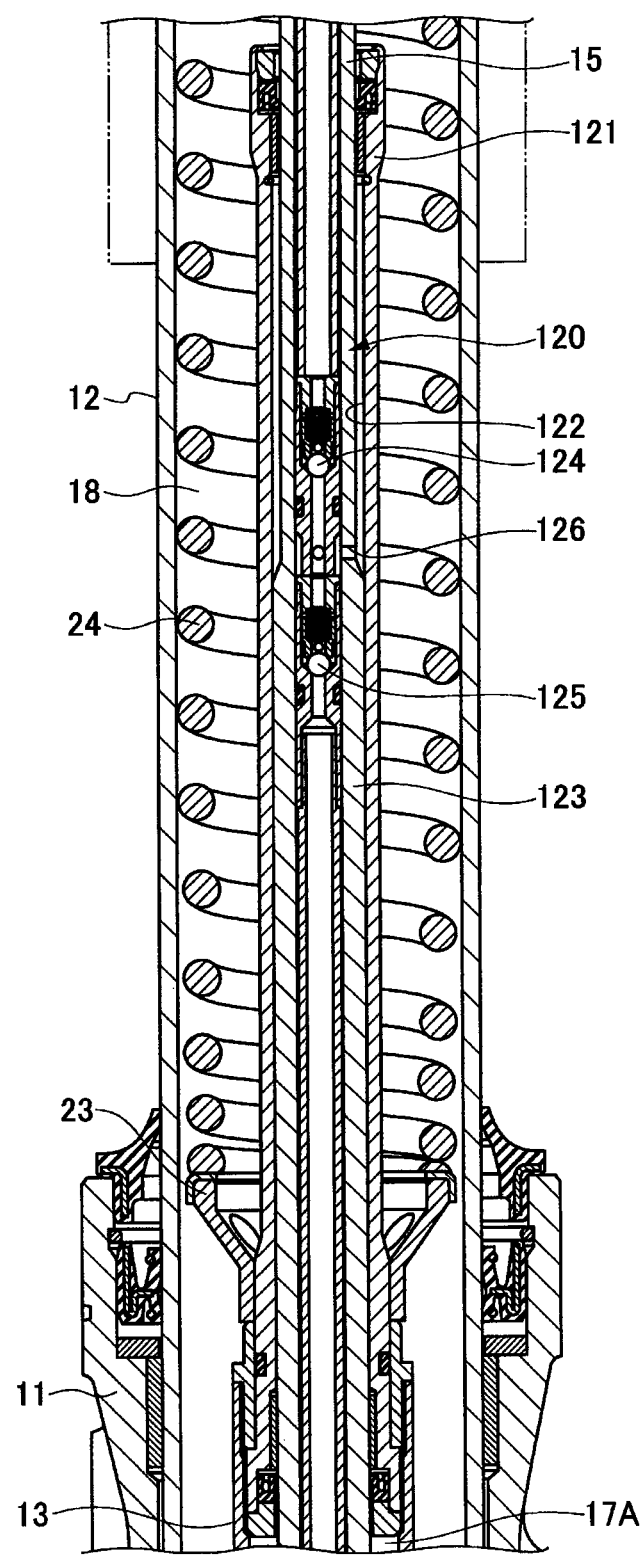
FIG. 4 is a cross-sectional view of an intermediate portion of the damper.
Figure 5:
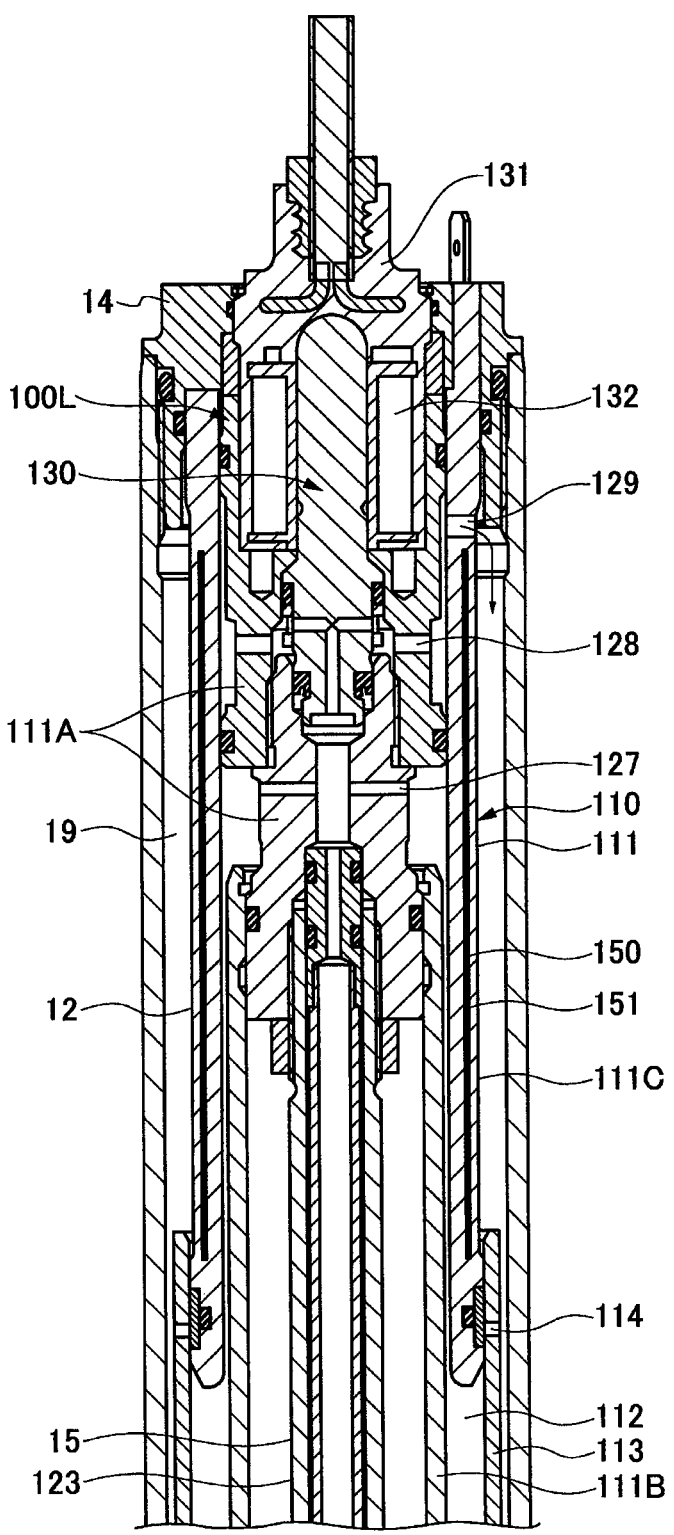
FIG. 5 is an enlarged cross-sectional view of a main part of FIG. 3.
Figure 6:
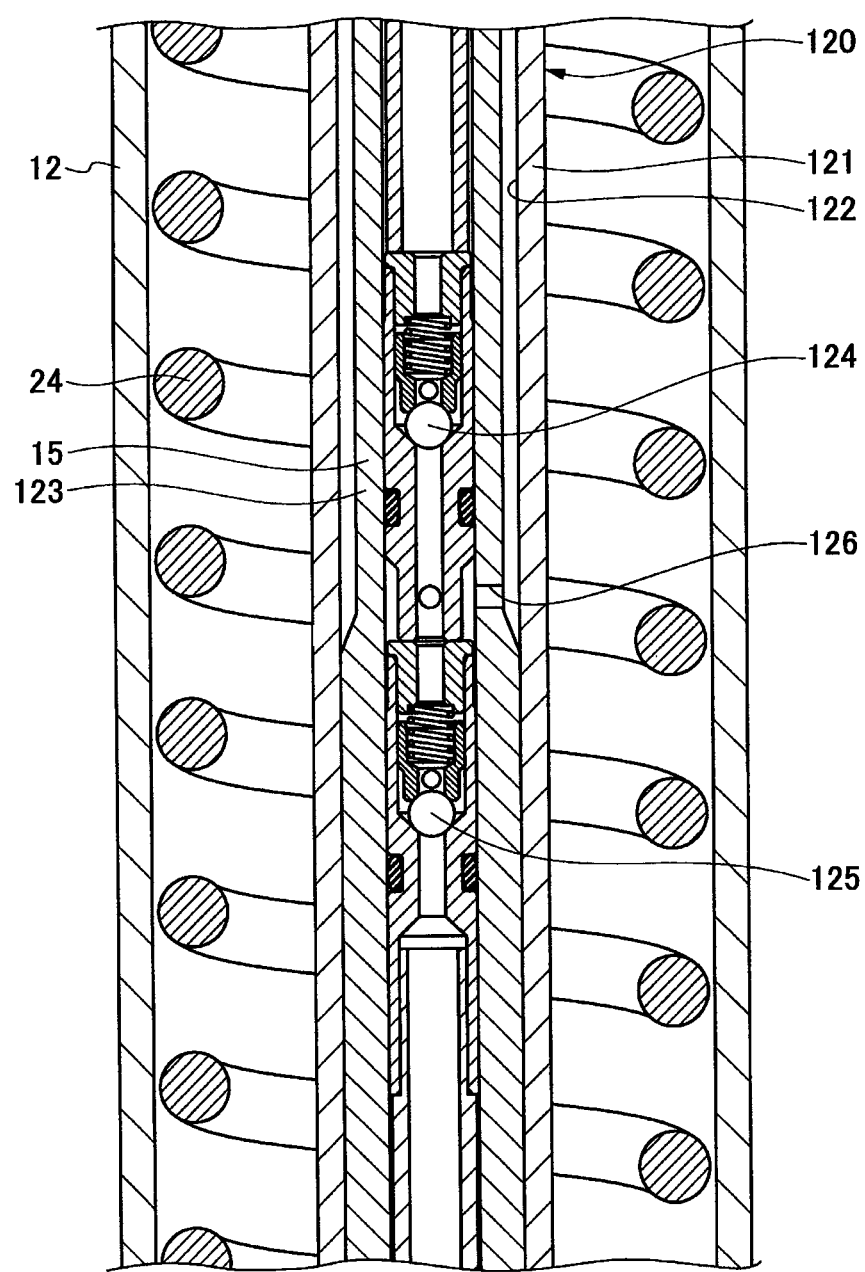
FIG. 6 is an enlarged cross-sectional view of a main part of FIG. 4.
Figure 7:
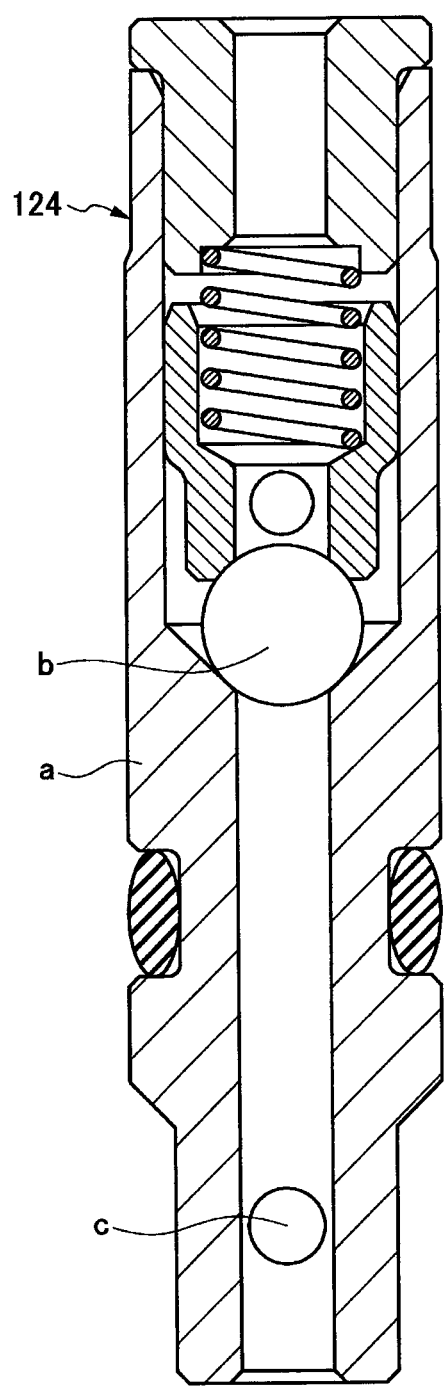
FIG. 7 is a cross-sectional view showing a check valve.
Figure 8:
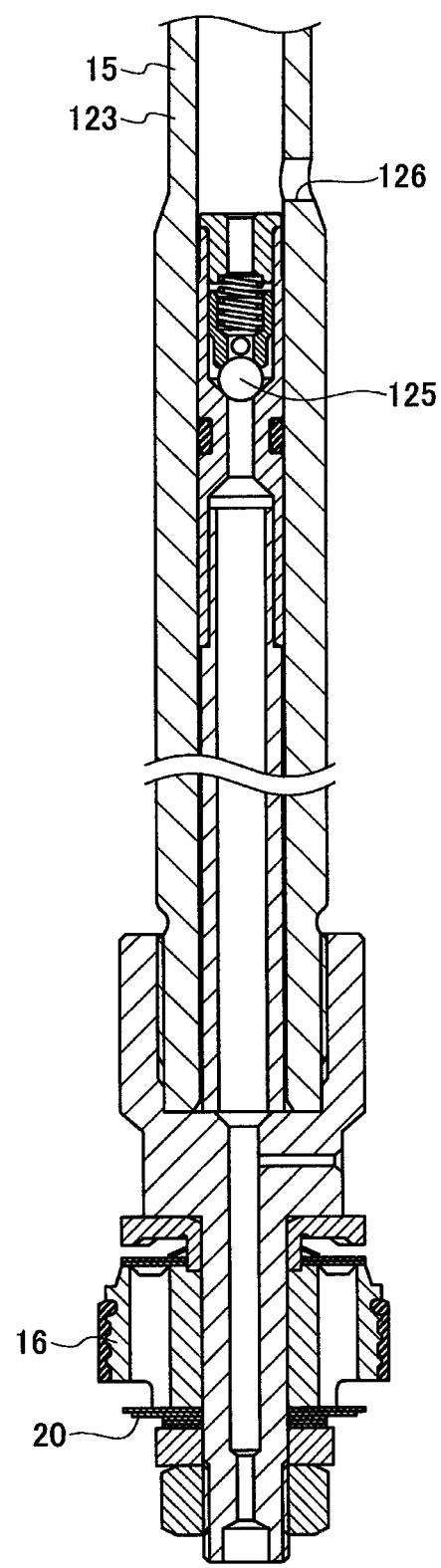
FIG. 8 is a cross-sectional view showing a piston rod.

The hydraulic pump 120 includes a discharge check valve 124 (FIG. 7) provided on an upper end side of the pump pipe 123 (FIG. 4 and FIG. 6) to discharge, toward the jack chamber 112 in the hydraulic jack 110, hydraulic oil in the pump chamber 122, which is pressurized by contracting motion of the pump pipe 123 (part of piston rod 15) advancing into the pump housing 121. The pump chamber 122, which is set to a negative pressure by extending motion of the pump pipe 123 (part of piston rod 15) retracting from the pump housing 121, includes a suction check valve 125 provided on a lower end side of the pump pipe 123 to suck hydraulic oil in the oil chamber 17 (FIG. 4 and FIG. 6). The discharge check valve 124 and the suction check valve 125 are arranged in series in a central portion of the pump pipe 123 in an axial direction thereof. The discharge check valve 124 and the suction check valve 125 are positioned by a small-diameter pipe member or the like inserted into the pump pipe 123. Internal passages formed between balls (b) in valve bodies (a) of the discharge check valve 124 and the suction check valve 125 are in communication with the pump chamber 122 through a communication hole (c) (FIG. 7) formed by drilling in the valve body (a) of the discharge check valve 124 in a radial direction thereof and a communication hole 126 (FIG. 8) formed by drilling in the pump pipe 123 in a radial direction thereof. Oil discharged by opening the discharge check valve 124 flows to the jack chamber 112 through a communication hole 127 formed by drilling in the upper jack housing 111A in the radial direction thereof.

Thus, the hydraulic pump 120 performs a pumping operation in conjunction with the extending and contracting motion of the pump pipe 123 (part of piston rod 15) advancing into and retracting from the pump housing 121 when the damper 10L is vibrated by recesses and protrusions on the road surface while the vehicle is traveling. When the pump chamber 122 is pressurized by the pumping operation resulting from the contracting motion of the pump pipe 123, the oil in the pump chamber 122 opens the discharge check valve 124 and is discharged toward the hydraulic jack 110 side. When the pump chamber 122 is set to the negative pressure by the pumping operation resulting from the extending motion of the pump pipe 123, the oil in the oil chamber 17 opens the suction check valve 125 and is sucked into the pump chamber 122.

The vehicle height control unit 100L has a selector valve 130 which is closed to stop the hydraulic oil supplied to the jack chamber 112 of the hydraulic jack 110 or which is opened to discharge the hydraulic oil into the oil reservoir chamber 18. The selector valve 130 according to the present embodiment is formed of a needle valve (not shown in the drawings) built in a valve housing 131 attached to the cap bolt 14 in the vehicle body side tube 12 in an inserted manner and driven by a solenoid 132. With respect to an upper space in the pump pipe 123, the selector valve 130 opens and closes communication holes 128 and 129 formed by drilling in the upper jack housing 111A and the outer jack housing 111C in the radial direction thereof and communicating with the oil reservoir chamber 18. When the selector valve 130 opens the communication holes 128 and 129 in the upper jack housing 111A and the outer jack housing 111C, the hydraulic oil in the jack chamber 112 is discharged into the oil reservoir chamber 18 via the communication hole 127 in the upper jack housing 111A.

Figure 9:
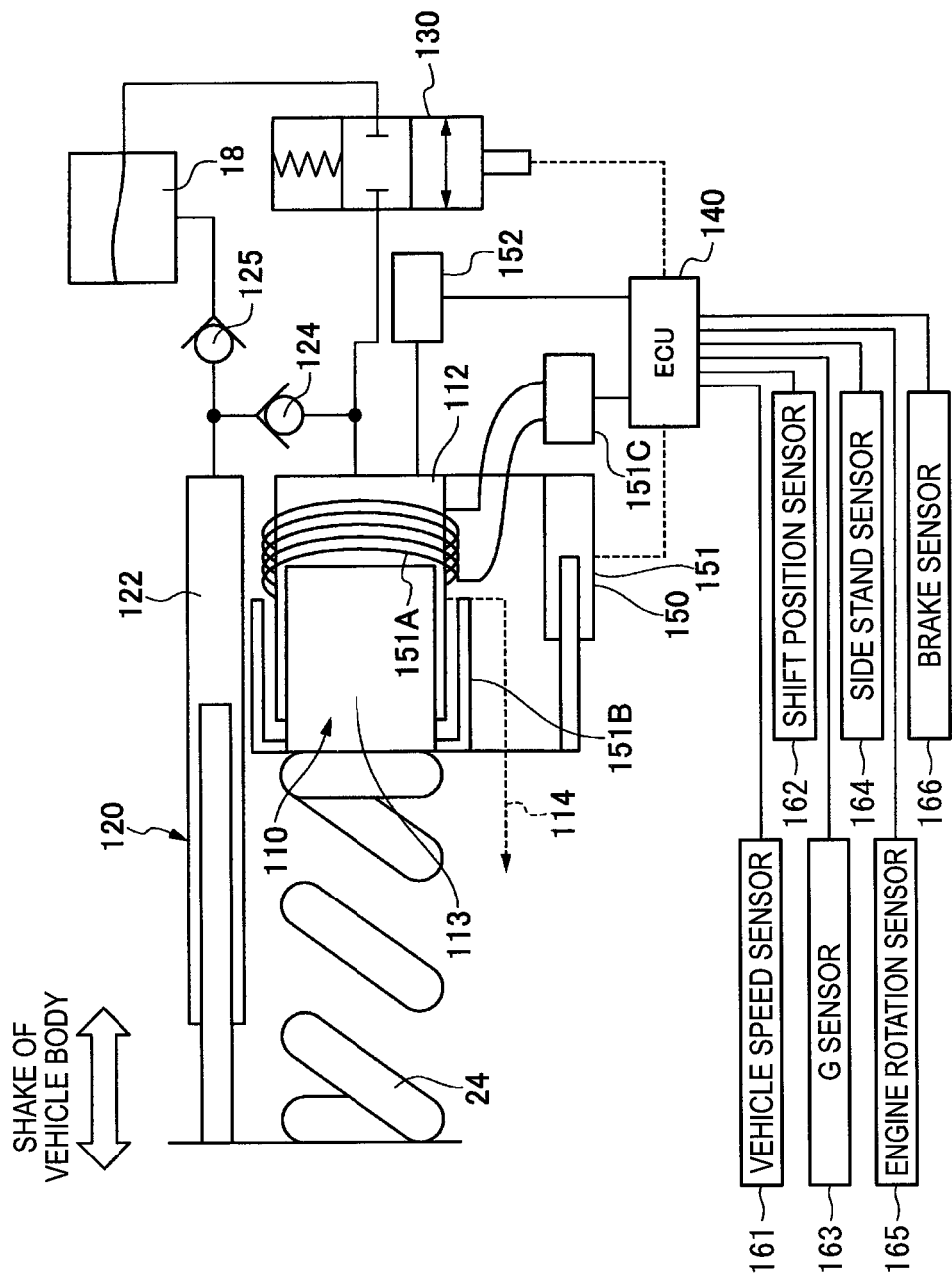
FIG. 9 is a circuit diagram showing an example of a control circuit.

The vehicle height control device 100 has a control circuit shown in FIG. 9. An ECU (control unit) 140 opens and closes the selector valve 130 in a controllable manner to adjust the level of the hydraulic oil (the amount of the hydraulic oil) supplied to the jack chamber 112 of the hydraulic jack 110 by the hydraulic pump 120, which performs a pumping operation in conjunction with the extending and contracting motion of the pump pipe 123 (part of piston rod 15) with respect to the pump housing 121. The adjusted oil level in turn adjusts the projecting height of the plunger 113 projecting from the jack chamber 112, thus controlling the vehicle height of the vehicle.

The ECU 140 according to the present embodiment receives detection signals from vehicle height detection unit 150, a vehicle speed sensor 161, a shift position sensor 162, a G sensor (acceleration and deceleration sensor) 163, a side stand sensor 164, an engine rotation sensor 165, a brake sensor 166, and the like to turn on and off the selector valve 130, formed of a solenoid valve, in a controllable manner.

The vehicle height detection unit 150 adopted may be one of projecting height detection unit 151 for detecting the height position of the plunger 113 in the hydraulic jack 110, hydraulic-pressure detection unit 152 for detecting a hydraulic pressure in the jack chamber 112 of the hydraulic jack 110, and extension and compression stroke length detection unit 153 (not shown in the drawings) for detecting the extension and compression stroke lengths of the vehicle body side tube 12 relative to the wheel side tube 11 or a combination of two or more of these units.

The vehicle height detection unit 150 according to the present embodiment adopts an inductance-based projecting height detection unit 151 for detecting the projecting height of the plunger 113. For example, as shown in FIG. 9, the projecting height detection unit 151 includes a coil 151A wound around an outer periphery of the hydraulic jack 110 and a cover 151B provided for the plunger 113 and disposed around an outer periphery of the hydraulic jack 110. The projecting height detection unit 151 changes the impedance of the coil 151A in accordance with displacement of the plunger 113. An output from the coil 151A is transmitted to the ECU 140 via a signal processing circuit 151C. The ECU 140 detects the projecting height of the plunger 113 based on the oscillation frequency of the coil 151A output by the signal processing circuit 151C. The projecting height detection unit 151 adopted may be based on a Hall element, capacitance, or the like instead of inductance.

In conjunction with a vehicle height control operation of the motorcycle, the vehicle height control device 100 will be described which adopts the control circuit in FIG. 9 using the selector valve 130 formed of a single two-port two-position solenoid valve. The selector valve 130 in FIG. 9 is of a normally closed type (however, the selector valve 130 may be of a normally open type).

In a vehicle height reducing control mode in which the ECU 140 outputs an on signal, the selector valve 130 is opened to connect the jack chamber 112 of the hydraulic jack 110 to the oil reservoir chamber 18 in the damper 10L. The hydraulic pump 120 discharges the hydraulic oil supplied to the jack chamber 112 of the hydraulic jack 110 into the oil reservoir chamber 18 to reduce the fluid level in the jack chamber 112 and thus the projecting height of the plunger 113. Thus, a vehicle height reducing operation can be performed.

In a vehicle height increasing control mode in which the ECU 140 outputs an off signal, the selector valve 130 is closed to shut the jack chamber 112 of the hydraulic jack 110 off from the oil reservoir chamber 18 in the damper 10L. The hydraulic pump 120 is prevented from discharging the hydraulic oil supplied to the jack chamber 112 of the hydraulic jack 110, enabling a vehicle height maintaining operation or a vehicle height increasing operation. At this time, the hydraulic pump 120 performs a pumping operation in conjunction with the above-described extending motion of the pump pipe 123 (part of piston rod 15) to suck the oil in the oil chamber 17 into the pump chamber 122 through the suction check valve 125. Then, the hydraulic pump 120 performs a pumping operation in conjunction with the above-described contracting motion of the pump pipe 123 (part of piston rod 15) to feed the oil in the pump chamber 122 into the jack chamber 112 of the hydraulic jack 110 through the discharge check valve 124. Thus, a vehicle height increasing operation can be performed.

Specifically, control modes carried out by the vehicle height control device 100 are as described below.

(A) Vehicle Height Reducing Control Mode

In the vehicle height increasing control mode in which the selector valve 130 is closed to enable a vehicle height increasing operation while the vehicle is traveling or is stopped for a long time, the ECU 140 in the vehicle height control device 100 shifts to the vehicle height reducing control mode in which the selector valve 130 is opened according to any one of the following control conditions 1 to 3.

1. Vehicle Speed Control

When the vehicle speed V of the vehicle is equal to or lower than a vehicle-height-reduction starting vehicle speed Vd (V≤Vd), the ECU 140 enters the vehicle height reducing control mode to open the selector valve 130 to enable a vehicle height reducing operation.

The ECU 140 presets the vehicle speed Vd. The vehicle speed Vd is, for example, 10 km/h.

2. Stoppage Prediction Time Control

The ECU 140 predicts a stoppage predicted time T for the vehicle. When the predicted stoppage predicted time T is equal to or less than a predetermined reference stoppage time Ta (T≤Ta), the ECU 140 enters the vehicle height reducing control mode to open the selector valve 130 to enable a vehicle height reducing operation.

The ECU 140 calculates deceleration from the vehicle speed of the vehicle or from information from the G sensor, and predicts the stoppage predicted time T based on the deceleration.

The ECU 140 defines the reference stoppage time Ta to be a time required to discharge the hydraulic oil filled in the jack chamber 112 of the hydraulic jack 110 (the time required to discharge oil from the jack chamber 112 into the oil reservoir chamber 18 in the damper 100L via the selector valve 130).

In this case, the ECU 140 presets the reference vehicle speed Va at which the prediction of the stoppage predicted time T for the vehicle is to be started. Then, when the vehicle speed V of the vehicle becomes equal to or lower than the reference vehicle speed Va (V≤Va), the ECU 140 predicts the stoppage predicted time T.

Instead of using the above-described control conditions satisfying T≤Ta and that V≤Va, the ECU 140 may enter the vehicle height reducing control mode to open the selector valve 130 to enable a vehicle height reducing operation when the deceleration α of the vehicle is equal to or higher than a reference deceleration αa (α≥αa).

The ECU 140 presets the reference speed Va, the reference stoppage time Ta, and the reference deceleration αa. The reference speed Va is, for example, 40 km/h, the reference stoppage time Ta is, for example, 2.5 sec, and the reference deceleration αa is, for example, 4 km/h/sec.

The stoppage predicted time is a parameter arithmetically predicted based on ever-changing vehicle motion parameters and representing an amount of time until the traveling vehicle stops in the immediately near future. The stoppage predicted time has a time dimension.

Actual comparative calculations may apparently involve no degree of "time" because, for example, the time dimension is divided into components for the respective sides of the comparison expression or comparison is carried out for each element.

For example, one of the simplest arithmetic expressions for the stoppage predicted time is $T=-V/\alpha=-V\cdot dt/dV$ (arithmetic expression for assumed constant acceleration). However, all of the following three comparison expressions have the same meaning. Even with a difference in comparison method resulting from the convenience of arithmetic operations, all of the comparison expressions effectively mean comparison with the stoppage predicted time.

$T<c$ ($c$ is a threshold; here, $c=Ta$)

$V<-c\cdot\alpha$ $-\alpha>c\cdot V$

In the example in which comparison is carried out for each element, comparison may be performed for each of the elements V and $\alpha$, used to calculate the stoppage predicted time, as in $(V<c1)\cap(-\alpha>c2)$ (c1 and c2 are thresholds). The results are ANDed together.

In this case, $T=-V/\alpha$ and thus the following expression is given: $Ta=(-c1)/(-c2)=c1/c2$.

3. Side Stand Control

Upon detecting resetting of a side stand of the vehicle from a standby position to an operating position, the ECU 140 enters the vehicle height reducing control mode and opens the selector valve 130 to enable a vehicle height reducing operation. The following control may also be performed. The ECU 140 monitors the vehicle speed. When the vehicle speed is equal to or higher than a very low speed (for example, 5 km/s), the ECU 140 avoids the reducing control even if the stand is in the operating position. The ECU 140 performs the reducing control only when the vehicle speed is zero.

(B) Vehicle Height Increasing Control Mode

In the vehicle height reducing control mode in which the selector valve 130 is opened and kept open as described in (A), the ECU 140 in the vehicle height control device 100 shifts to the vehicle height increasing control mode in which the selector valve 130 is closed according to one of the following control conditions 1 to 4.

When entering the vehicle height increasing control mode to close the open selector valve 130, the ECU 140 turns off a voltage E0 applied to the selector valve 130 (E0=0 V).

1. Vehicle Speed Control

When the vehicle speed V exceeds the vehicle-height-reduction starting vehicle speed Vd (or a vehicle-height-increase starting vehicle speed Vu set independently of the vehicle-height-reduction starting vehicle speed Vd) (V>Vd or V>Vu), the ECU 140 halts the vehicle height reducing control mode, enters the vehicle height increasing control mode, and closes the selector valve 130 to enable a vehicle height increasing operation.

The ECU 140 presets the vehicle-height-reduction starting vehicle speed Vd (or the vehicle-height-increase starting vehicle speed Vu). The vehicle-height-reduction starting vehicle speed Vd or the vehicle-height-increase starting vehicle speed Vu is, for example, 40 km/h.

2. Stoppage Predicted Time Control

The ECU 140 predicts the stoppage predicted time T of the vehicle. When the predicted stoppage predicted time T exceeds a predetermined secondary reference stoppage time Tb (T>Tb), the ECU 140 halts the vehicle height reducing control mode, enters the vehicle height increasing control mode, and closes the selector valve 130 to enable the vehicle height increasing operation.

The ECU 140 predicts the stoppage predicted time T of the vehicle based on the deceleration (or acceleration) of the vehicle.

At this time, the ECU 140 predefines a secondary reference vehicle speed Vb at which the prediction of the stoppage time T of the vehicle is to be started. When the vehicle speed V exceeds the secondary reference vehicle speed Vb (V>Vb), the ECU 140 predicts the stoppage predicted time T.

In the stoppage predicted time control, the ECU 140 may halt the vehicle height reducing control mode, enter the vehicle height increasing control mode, and close the selector valve 130 to enable the vehicle height increasing operation when the acceleration $\beta$ of the vehicle exceeds a predetermined reference acceleration $\beta b$ ($\beta>\beta b$) instead of using the above-described control conditions satisfying T>Tb and that V>Vb.

The ECU 140 predefines the secondary reference vehicle speed Vb, the secondary reference stoppage time Tb, and the reference acceleration $\beta b$. The secondary reference vehicle speed Vb is, for example, 40 km/h, the secondary reference stoppage time Tb is, for example, 3 sec, and the reference acceleration $\beta b$ is, for example, 5 km/h/sec.

3. Long-Stoppage Control

When the stoppage time of the vehicle is equal to or more than a predetermined continued stoppage time Tc, the ECU 140 halts the vehicle height reducing control mode, enters the vehicle height increasing control mode, and closes the selector valve 130 to enable a vehicle height increasing operation.

The ECU 140 predefines the continued stoppage time Tc of the vehicle. The continued stoppage time Tc is, for example, 30 sec.

4. Neutral Control

When the vehicle speed V=0 and the vehicle is in a neutral shift position, the ECU 140 halts the vehicle height reducing control mode, enters the vehicle height increasing control mode, and closes the selector valve 130 to enable a vehicle height increasing operation.

(C) Height Retaining Mode

While the vehicle is traveling, the ECU 140 in the vehicle height control device 100 retains the vehicle height at any intermediate height position preset as desired by opening or closing the selector valve 130 in a controllable manner based on a detection result from the vehicle height detection unit 150.

That is, an upper threshold for the vehicle height is set to a value H1, beyond which the vehicle height starts to be reduced, so, at which ECU 140 switches the selector valve 130 from an OFF operation (height increasing control mode) to an ON operation to open the selector valve 130. A lower threshold for the vehicle height is set to a value H2, below which the vehicle height starts to be increased, so, at which the ECU 140 switches the selector valve 130 from the ON operation (height reducing control mode) to the OFF operation to close the selector valve 130. Thus, the ECU 140 retains the vehicle height of the motorcycle during travel at an intermediate height position between H1 and H2 based on the detection result from the vehicle height detection unit 150.

Thus, the vehicle height control device 100 as described above may retain the vehicle height at any intermediate height position between the maximum height position defined by the highest possible projecting end of the plunger 113 in the hydraulic jack 110 and the minimum height position defined by the lowest possible sinking end of the plunger 113 in the hydraulic jack 110.

Furthermore, the vehicle height can be instantaneously switched by adopting a solenoid valve as the selector valve 130 serving as the means for switching the vehicle height.

The vehicle height during the detection can be estimated by adopting the projecting height detection unit 151 for detecting the projecting height of the plunger 113 in the hydraulic jack 110, as the vehicle height detection unit 150.

Furthermore, the vehicle height during the detection can be estimated by adopting the hydraulic-pressure detection unit 152 for detecting the hydraulic pressure in the jack chamber 112 in the hydraulic jack 110 as the vehicle height detection unit 150. At this time, applying a filter (low pass) to the detection result from the hydraulic-pressure detection unit 152 enables the vehicle weight (loading capacity) to be estimated. When the vehicle weight is high and the vehicle height tends to decrease, the vehicle height is increased to prevent the damper 10L from being compressed to the limit. When the vehicle weight is low and the vehicle height tends to increase, the vehicle height is reduced to prevent the damper 100L from being extended to the limit.

Furthermore, the vehicle height during the detection can be estimated by adopting the extension and compression stroke length detection unit 153 for detecting the extension or compression stroke length of the vehicle body side tube 12 with respect to the wheel side tube 11 as the vehicle height detection unit 150. At this time, applying a filter (band pass) to the detection result from the extension and compression stroke length detection unit 153 allows the recessed and protruding status (amplitude status) of the road surface to be estimated. When the road surface has a large amplitude, the vehicle height is increased to prevent the damper 10L from being compressed to the limit or is adjusted to an appropriate value to prevent the damper 10L both from being compressed to the limit and from being extended to the limit. When the road surface has a small amplitude, the vehicle height is reduced to relax wind resistance if the vehicle is of an on-road type and to prevent the vehicle body from pitching if the vehicle is of an off-road type.

(Configuration of the Damper 10R) (FIG. 1)

As shown in FIG. 1, the damper 10R includes a wheel-side outer tube 211 and a vehicle body-side inner tube 212 slidably inserted into the wheel-side outer tube 211 to form an upright front fork. The damper 10R includes a damper cylinder 213 attached to a bottom portion of the outer tube 211 and installed upright inside the outer tube 211, a cap bolt 214 attached to an upper end portion of the inner tube 212 in a threaded manner and to which a spring load adjusting sleeve 215 is attached in a threaded manner, and a hollow piston rod 216 fixed to a lower end portion of the spring load adjusting sleeve 215. The piston rod 216 is inserted into an oil chamber 217 inside the damper cylinder 213 and includes a piston 218 at an insertion leading end thereof. The oil chamber 217 is partitioned into an upper oil chamber 217A and a lower oil chamber 217B by the piston 218. Between the outer tube 211 and the inner tube 212 in the damper 10R, an oil reservoir chamber 219 is formed by a space around an outer periphery of the damper cylinder 213, and an air chamber 220 is formed above the oil reservoir chamber 219.

The damper 10R includes a suspension spring 224 installed between a spring bearing 222 backed up by a spring collar 221 supported by the spring load adjusting sleeve 215 provided in the cap bolt 214 and a spring bearing 223 provided in an upper end portion of the damper cylinder 213.

The damper 10R includes a first damping force generator 231 in the piston 218. The first damping force generator 231 generates a compression side damping force and an extension side damping force. The damper 100R includes a second damping force generator 232 on a bottom portion side of the outer tube 211. The second damping force generator 232 generates a compression side damping force and an extension side damping force.

Thus, the damper 10R buffers an impact force applied by the road surface, by means of the spring force of the suspension spring 224 and the spring force of the air chamber 220.

The compression- and extension side damping forces generated by the first damping force generator 231 and the second damping force generator 232 damp stretching vibration involved in the absorption of the impact force by the suspension spring 224 and the air chamber 220.

The damper 100R includes a damping force adjusting rod 233 coaxially and relatively rotatably installed inside the spring load adjusting sleeve 215 provided in the cap bolt 214. The damping force adjusting rod 233 adjusts the damping force by using a leading-end needle inserted into a hollow portion of the piston rod 216 to throttle a passage area of a bypass passage that makes the oil chamber 217A and the oil chamber 217B located above and below the piston 218 in communication with each other while bypassing the piston 218.

Thus, the vehicle height control device 100 includes the suspension springs 24 and 224 in the left damper 10L and right damper 10R, respectively. In this case, according to the present embodiment, the spring load on the suspension spring 24 provided in one of the left and right dampers, that is, the damper 10L, is set higher than the spring load on the suspension spring 224 provided in the other of the left and right dampers, that is, the damper 10R.

The present embodiment exerts the following effects.

(a) The damper 10L has a configuration including "the wheel side tube 11 and the vehicle body side tube 12 slidably engaged; the damper cylinder 13 provided upright in the inner bottom portion of the wheel side tube 11; the piston rod 15 hanging from the upper end portion of the vehicle body side tube 12 and inserted into the oil chamber 17 in the damper cylinder 13, the oil chamber 17 being partitioned by the piston 16 provided at the leading end portion of the piston rod 15, into the upper oil chamber 17A above the piston 16 and the lower oil chamber 17B below the piston 16; and the oil reservoir chamber 18 defined outside the damper cylinder 13 and spanning to the upper portion of the vehicle body side tube 12, the oil reservoir chamber 18 having an upper portion that forms the air chamber 19". In connection with the configuration, the damper 10L includes the vehicle height control unit 100L including "the jack housing 111 of the hydraulic jack 110 provided at the upper end portion of the vehicle body side tube 12 such that the plunger 113 which defines the jack chamber 112 in the hydraulic jack 110 is fitted on the jack housing 111 of the hydraulic jack 110 so as to be movable up and down; the suspension spring 24 provided between the plunger 113 of the hydraulic jack 110 and the wheel side tube 11; the pump housing 121 provided in the upper end portion of the damper cylinder 13 and forming the pump chamber 122 in the hydraulic pump 120 such that the pump pipe 123 forming a part of the piston rod 15 and communicating with the oil chamber 17 in the damper cylinder 13 is slidably inserted into the pump chamber 122 in the pump housing 121; the selector valve 130 controlling the vehicle height by adjustment of the amount of hydraulic oil fed to the jack chamber 112 in the hydraulic jack 110 by the hydraulic pump 120 performing the pumping operation in conjunction with extending and contracting motion of the pump pipe 123 with respect to the pump housing 121; and the ECU 140 opening and closing the selector valve 130 in a controllable manner". Thus, the damper 10L provided with the vehicle height control unit 100L can be simply configured.

(b) The vehicle height control device has the detection unit 151 for detecting the height position of the plunger 113 of the hydraulic jack 110 and the ECU 140 that opens or closes the selector valve 130 in a controllable manner according to the result of the detection by the detection unit 151. Based on the result of the detection by the detection unit 151, the plunger 113 of the hydraulic jack 110 can be set to any height position, and thus the vehicle height can be adjusted to any height position.

(c) The selector valve 130 is provided at the upper end portion of the vehicle body side tube 12. The selector valve 130 formed of a solenoid or the like can be disposed at a sprung position above the suspension spring 24 where an input of vibration is small.

(d) The stoppage predicted time of the vehicle is predicted, and when the predicted stoppage predicted time is equal to or less than the predetermined reference stoppage time, the vehicle height reducing control mode is entered to switch the selector valve 130, thus enabling a vehicle height reducing operation. The vehicle height starts to be reduced during travel when the vehicle is about to stop. The vehicle height is completely reduced within a short time until the vehicle stops. This allows rider's feet to appropriately touch the ground, thus ensuring stability.

(e) The vehicle height control unit 100L is provided only in the one of the left and right dampers, that is, the damper 10L. This enables a reduction in the occupied space, weight, and costs of the vehicle height control device 100.

(f) The suspension springs 24 and 224 are provided in the left and right dampers 10L and 100R, respectively, and the spring load on the suspension spring 24 provided in the one of the left and right dampers, that is, the damper 10L, is set higher than the spring load on the suspension spring 224 provided in the other of the left and right dampers, that is, the damper 10R. This allows enhancement of the support capability of the suspension spring 24 for the damper 100L provided with the vehicle height control unit 100L.

The spring load on the suspension spring 24 provided in the one of the left and right dampers, that is, the damper 10L, can be increased by setting a spring constant for the suspension spring 24 larger than a spring constant for the suspension spring 224 provided in the other of the left and right dampers, that is, the damper 10R.

Figure 10:
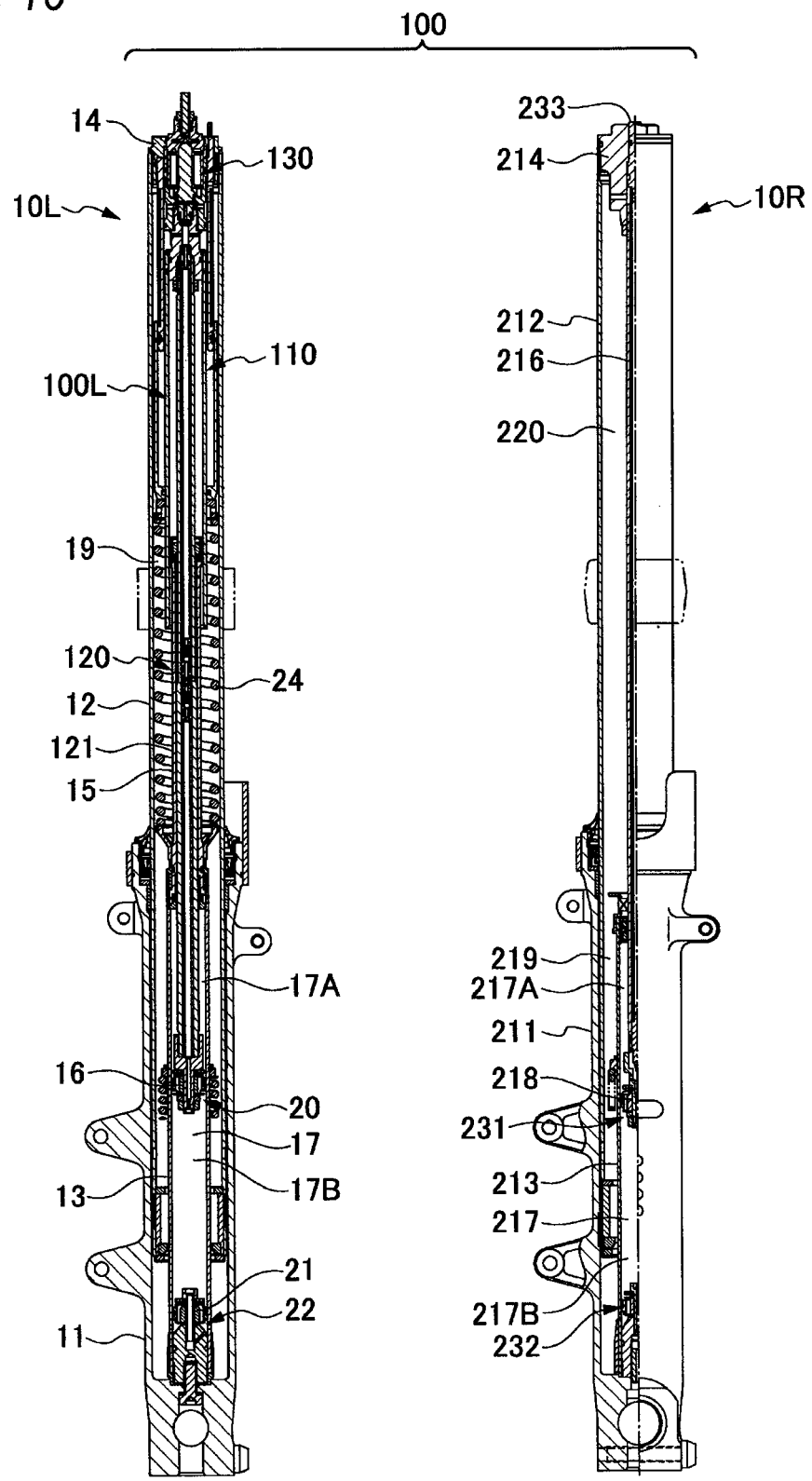
FIG. 10 is a cross-sectional view showing a left damper and a right damper included in a variation of the vehicle height control device.

FIG. 10 shows the vehicle height control device 100 according to a variation of the embodiment shown in FIG. 1. In this vehicle height control device 100, the suspension spring 24 is provided only in the one of the left and right dampers 10L and 10R, that is, the damper 100L. The suspension spring 224 is removed from the other of the left and right dampers, that is, the damper 10R, and no suspension spring is provided in the damper 10R.

At this time, the amount by which the plunger 113 of the hydraulic jack 110 provided in the one of the left and right dampers, that is, the damper 100L, elevates and lowers is equivalent to double the amount by which the hydraulic jack 110 elevates and lowers assuming a case that a vehicle height control unit similar to the vehicle height control unit 100L is also provided in the damper 10R.

Thus, the vehicle height control device 100 exerts the following effects.

(a) The suspension spring 24 is provided only in the one of the left and right dampers, that is, the damper 10L. The suspension spring 224 is not provided in the other of the left and right dampers, that is, the damper 10R. Thus, the suspension spring 224 is not provided in the damper that is not provided with the vehicle height control unit 100L. This enables a reduction in the occupied space, weight, and costs of the vehicle height control device 100.

(b) The amount by which the hydraulic jack 110 provided in the one of the left and right dampers, that is, the damper 10L, elevates and lowers is equivalent to double the amount by which the hydraulic jack 110 elevates and lowers assuming a case that the vehicle height control units 100L are respectively provided in the left damper 10L and the right damper 100R. Thus, the spring load on the suspension spring 24 can be substantially doubled due to the deflection of the suspension spring 24 caused by the provision of the vehicle height control unit 100L and the suspension spring 24 only in the one of the dampers, that is, the damper 10L.

Embodiment 2

FIG. 11 to FIG. 15

Figure 11:
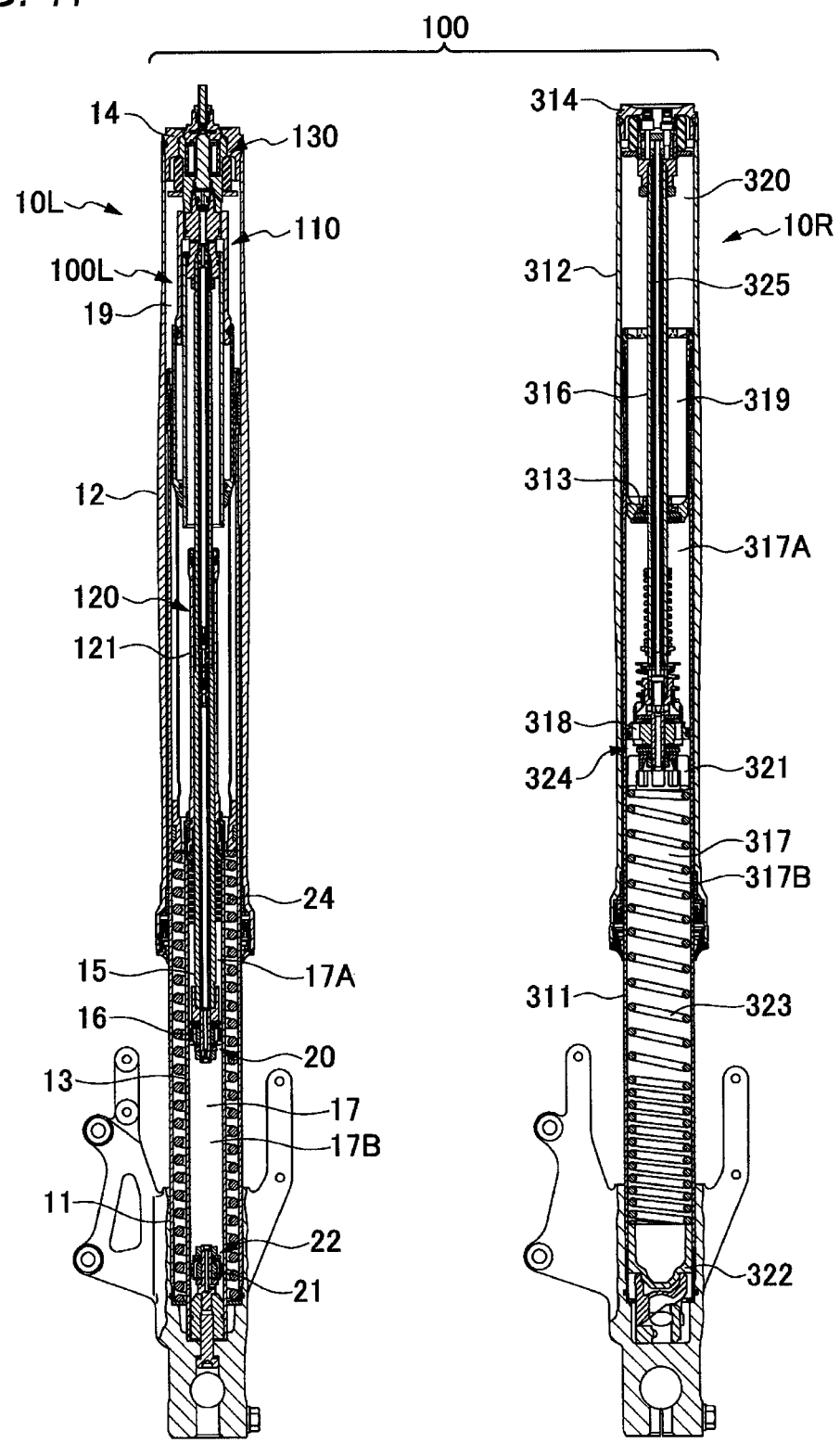
FIG. 11 is a cross-sectional view showing a left damper and a right damper included in a vehicle height control device according to Embodiment 2.

FIG. 11 shows a pair of dampers 10L and 10R disposed on a left side and a right side, respectively, of a vehicle so as to form a front fork of a motorcycle. In this case, in a motorcycle according to the present embodiment, a vehicle height control device 100 is configured by providing a vehicle height control unit 100L only in one of the left and right dampers, that is, the damper 100L. The damper 100L and the damper 10R will be described below in detail.

(Configuration of the Damper 100L) (FIG. 11 to FIG. 14)

The damper 100L includes a wheel side tube (inner tube) 11 located on a wheel side and which is closed at one end and which is open at the other end, and a vehicle body side tube (outer tube) 12 located on a vehicle body side and into which the wheel side tube 11 is slidably inserted, so as to form an upside-down front fork, as shown in FIG. 11 to FIG. 14.

The damper 10L includes a damper cylinder 13 provided upright in an inner bottom portion of the wheel side tube 11. A cap bolt 14 is threaded in an upper end portion of the vehicle body side tube 12. A jack housing 111 of a hydraulic jack 110 described below is attached to the cap bolt 14. A piston rod 15 is attached to a lower portion of the jack housing 111. The piston rod 15 hangs from an upper end portion of the vehicle body side tube 12 and extends through a pump housing 121 fixed as described below to an upper end portion of the damper cylinder 13 into an oil chamber 17 inside the damper cylinder 13. The oil chamber 17 is partitioned by a piston 16 provided at a leading end portion of the piston rod 15 into an upper oil chamber 17A above the piston 16 and a lower oil chamber 17B below the piston 16.

The damper 10L includes an oil reservoir chamber 18 defined outside the damper cylinder 13 and spanning to an upper portion of the vehicle body side tube 12. An air chamber 19 is located above the oil reservoir chamber 18.

The damper 10L includes a damping force generator 20 provided in a communication path formed in the piston 16 and through which the upper oil chamber 17A and the lower oil chamber 17B are in communication with each other. The damper 10L also includes a base piston 21 in a bottom portion of the damper cylinder 13 and a damping force generator 22 provided in a communication path formed in the base piston 21 and through which the lower oil chamber 17B and the oil reservoir chamber 18 are in communication with each other, and this communication path compensates for the volume of the piston rod 15, which advances into and retracts from damper cylinder 13. The damping force generator 20 generates an extension side damping force, and the damping force generator 22 generates a compression side damping force.

The damper 10L includes a suspension spring 24 provided between a plunger 113 of a hydraulic jack 110 described below and the wheel side tube 11, and in the present embodiment, around the damper cylinder 13 provided upright in the inner bottom portion of the wheel side tube 11 and between a bottom portion of the wheel side tube 11 and a spring bearing 23 provided at a lower end portion of the plunger 113 via a spring collar 23A. Thus, the damper 10L buffers an impact force applied by a road surface by means of the spring force of the suspension spring 24 and the spring force of the air chamber 19. The compression- and extension side damping forces generated by the damping force generators 20 and 22 damp stretching vibration involved in absorption of the impact force by the suspension spring 24 and the air chamber 19.

Now, the vehicle height control unit 100L will be described in detail which is provided only in one of the left and right dampers, that is, the damper 10L, in order to configure the vehicle height control device 100.

Figure 12:
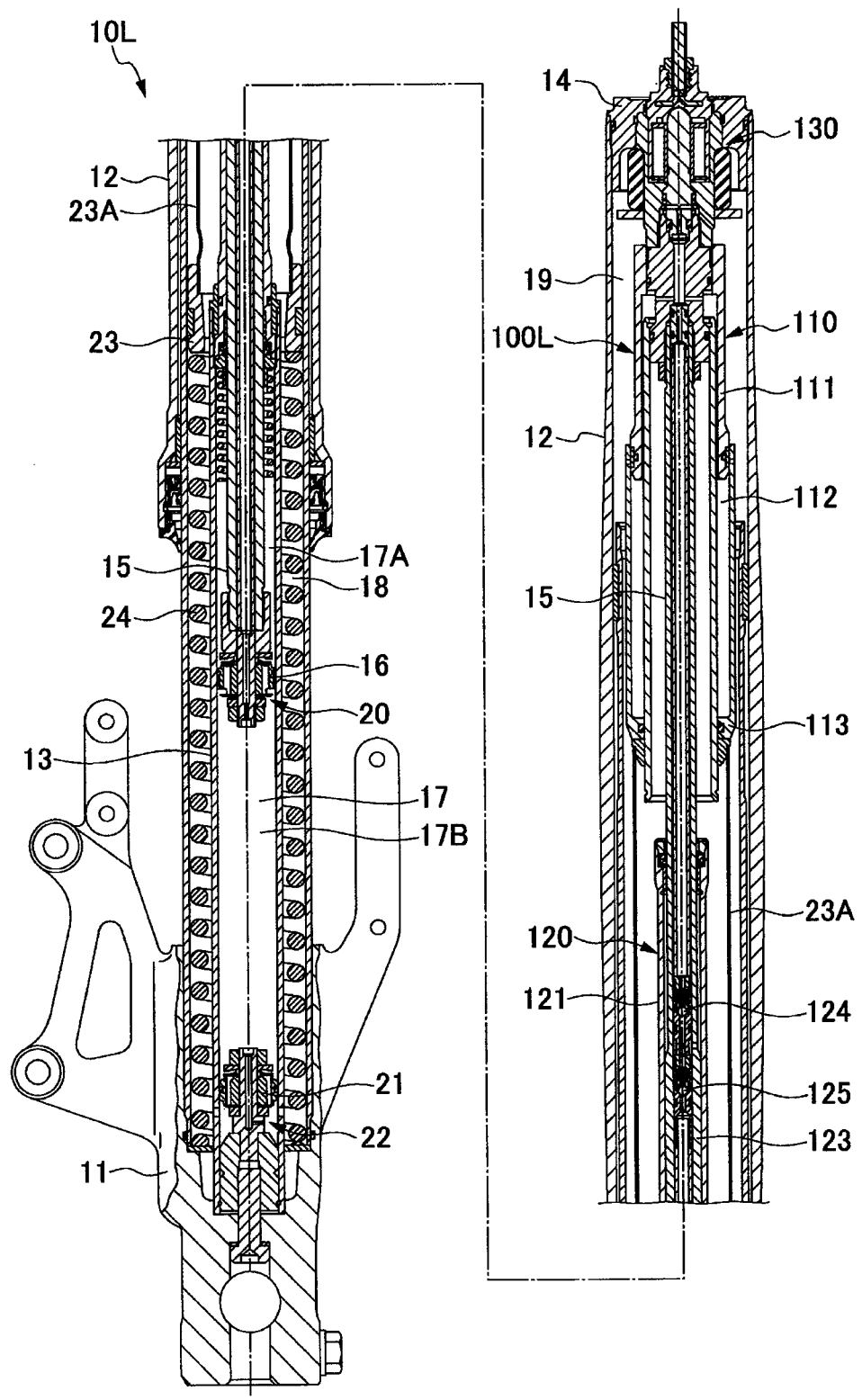
FIG. 12 is a cross-sectional view showing the damper.
Figure 13:
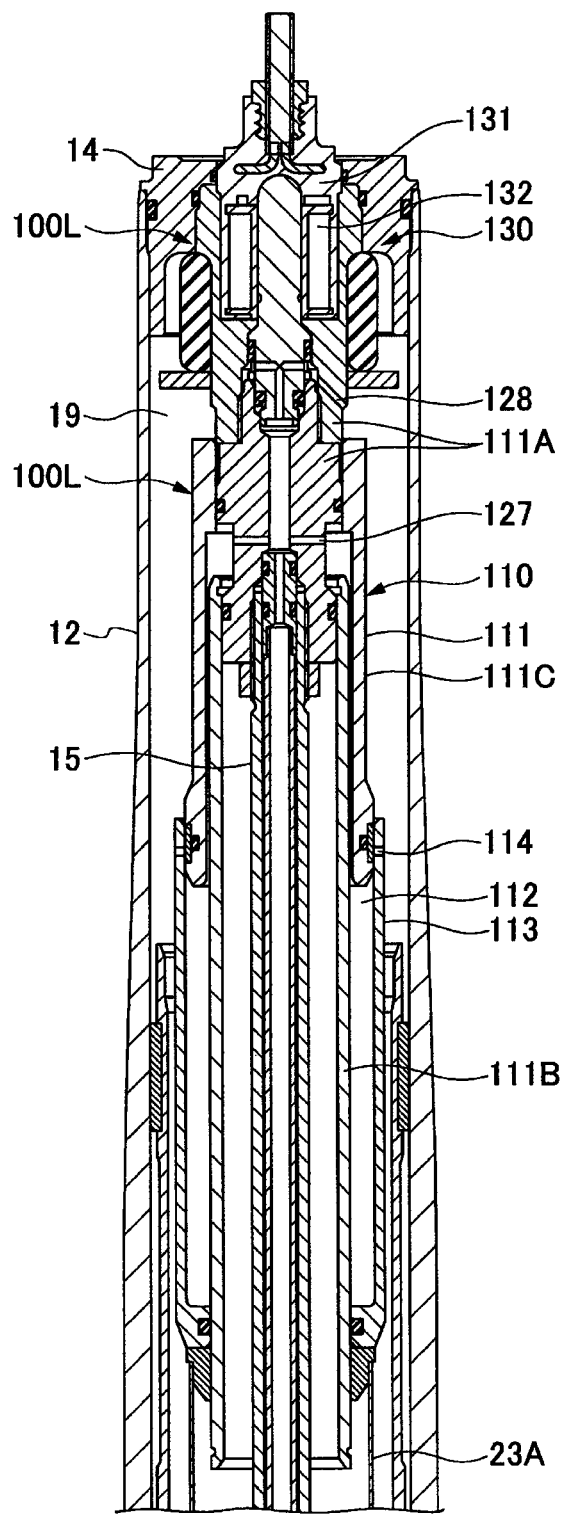
FIG. 13 is a cross-sectional view of an upper portion of the damper.
Figure 14:
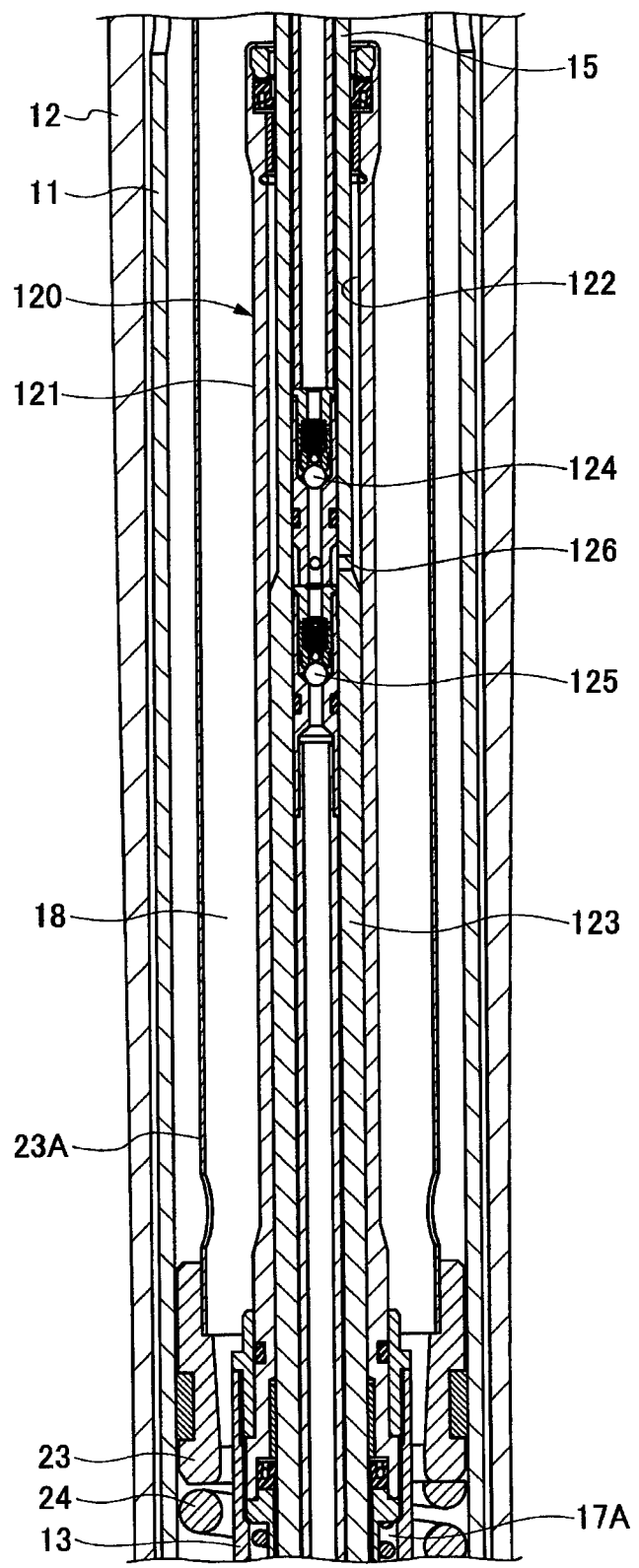
FIG. 14 is a cross-sectional view of an intermediate portion of the damper.

(Vehicle Height Control Unit 100L of the Vehicle Height Control Device 100) (FIG. 12 to FIG. 14)

The vehicle height control unit 100L is configured as in the case of Embodiment 1 and includes the jack housing 111 of the hydraulic jack 110 provided in the upper end portion of the vehicle body side tube 12 such that the plunger 113 defining a jack chamber 112 in the hydraulic jack 110 is fitted on the jack housing 111 so as to be movable up and down.

The jack housing 111 of the hydraulic jack 110 includes an upper jack housing 111A provided around a valve housing 131 for a selector valve 130 attached to the cap bolt 14 and described below, a lower jack housing 111B connected to a lower portion of the upper jack housing 111A, and an outer jack housing 111C connected to an outer periphery of the upper jack housing 111A and extending around the lower jack housing 111B.

The plunger 113 of the hydraulic jack 110 is formed of a cylinder that slides, in a liquid tight manner, around an outer periphery of the outer jack housing 111C and lower jack housing 111B of the jack housing 111. A blow hole 114 is formed on an upper end side of the plunger 113 so that when the plunger 113 lowers from the jack housing 111 to a maximum projecting end, hydraulic oil in the jack chamber 112 is let out into the oil reservoir chamber 18 through the blow hole 114.

The damper 10L includes a pump housing 121 provided in an upper end portion of the damper cylinder 13 and forming a pump chamber 122 of the hydraulic pump 120. A pump pipe 123 formed of the hollow piston rod 15 and communicating with the oil chamber 17 in the damper cylinder 13 is slidably inserted into the pump chamber 122 in the pump housing 121. In the present embodiment, an annular space between the pump housing 121 and an outer-peripheral reduced diameter portion of the piston rod 15 forms the pump chamber 122.

The hydraulic pump 120 includes a discharge check valve 124 (FIG. 7) provided on an upper end side of the pump pipe 123 (FIG. 14) to discharge, toward the jack chamber 112 in the hydraulic jack 110, hydraulic oil in the pump chamber 122, which is pressurized by contracting motion of the pump pipe 123 (part of piston rod 15) advancing into the pump housing 121. The pump chamber 122, which is set to a negative pressure by extending motion of the pump pipe 123 (part of piston rod 15) retracting from the pump housing 121, includes a suction check valve 125 provided on a lower end side of the pump pipe 123 to suck hydraulic oil in the oil chamber 17 (FIG. 14). The discharge check valve 124 and the suction check valve 125 are arranged in series in a central portion of the pump pipe 123 in an axial direction thereof. The discharge check valve 124 and the suction check valve 125 are positioned by a small-diameter pipe member or the like inserted into the pump pipe 123. Internal passages formed between balls (b) in valve bodies (a) of the discharge check valve 124 and the suction check valve 125 are in communication with the pump chamber 122 through a communication hole (c) (FIG. 7) formed by drilling in the valve body (a) of the discharge check valve 124 in a radial direction thereof and a communication hole 126 (FIG. 8) formed by drilling in the pump pipe 123 in a radial direction thereof. Oil discharged by opening the discharge check valve 124 flows to the jack chamber 112 through a communication hole 127 formed by drilling in the upper jack housing 111A in the radial direction thereof.

Thus, the hydraulic pump 120 performs a pumping operation in conjunction with the extending and contracting motion of the pump pipe 123 (part of piston rod 15) advancing into and retracting from the pump housing 121 when the damper 100L is vibrated by recesses and protrusions on the road surface while the vehicle is traveling. When the pump chamber 122 is pressurized by the pumping operation resulting from the contracting motion of the pump pipe 123, the oil in the pump chamber 122 opens the discharge check valve 124 and is discharged toward the hydraulic jack 110 side. When the pump chamber 122 is set to the negative pressure by the pumping operation resulting from the extending motion of the pump pipe 123, the oil in the oil chamber 17 opens the suction check valve 125 and is sucked into the pump chamber 122.

The vehicle height control unit 100L has a selector valve 130 which is closed to stop the hydraulic oil supplied to the jack chamber 112 of the hydraulic jack 110 or which is opened to discharge the hydraulic oil into the oil reservoir chamber 18. The selector valve 130 according to the present embodiment is formed of a needle valve (not shown in the drawings) built in a valve housing 131 attached to the cap bolt 14 in the vehicle body side tube 12 in an inserted manner and driven by a solenoid 132. With respect to an upper space in the pump pipe 123, the selector valve 130 opens and closes communication holes 128 formed by drilling in the upper jack housing 111A in the radial direction thereof and communicating with the oil reservoir chamber 18. When the selector valve 130 opens the communication holes 128 in the upper jack housing 111A, the hydraulic oil in the jack chamber 112 is discharged into the oil reservoir chamber 18 via the communication hole 127 in the upper jack housing 111A.

The vehicle height control device 100 has a control circuit (FIG. 9) similar to the control circuit in Embodiment 1. An ECU (control unit) 140 opens and closes the selector valve 130 in a controllable manner to allow the hydraulic pump 120, which performs the pumping operation in conjunction with the extending and contracting motion of the pump pipe 123 (part of piston rod 15) with respect to the pump housing 121, to adjust the level of the hydraulic oil (the amount of the hydraulic oil) supplied to the jack chamber 112 of the hydraulic jack 110, and thus the projecting height of the plunger 113 projecting from the jack chamber 112. As a result, the vehicle height of the vehicle is controlled.

(Configuration of the Damper 10R) (FIG. 11)

As shown in FIG. 11, the damper 100R includes a wheel-side inner tube 311 and a vehicle body-side outer tube 312 slidably inserted in the wheel-side inner tube 311 so as to form an upside-down front fork. The damper 100R includes a partition wall member 313 provided on an upper end side of the inner tube 311, a cap bolt 314 attached to an upper end portion of the outer tube 312 in a threaded manner, and a hollow piston rod 316 fixed to the cap bolt 314. The piston rod 316 is inserted into an oil chamber 317 inside the inner tube 311 through the partition wall member 313 of the inner tube 311. The piston rod 316 includes a piston 318 at this insertion leading end portion. The oil chamber 317 is partitioned into an upper oil chamber 317A and a lower oil chamber 317B by the piston 318. Inside the inner tube 311 and the outer tube 312, the damper 10R includes an oil reservoir chamber 319 located above the partition wall member 313 and an air chamber 320 located above the oil reservoir chamber 319.

The damper 100R includes a suspension spring 323 interposed between a spring bearing 321 provided below the piston 318 on the piston rod 316 and a spring bearing 322 provided in a bottom portion of the inner tube 311.

The damper 10R includes a damping force generator 324 in the piston 318. The damper 10R buffers an impact force applied by the road surface by means of the spring force of the suspension spring 323 and the spring force of the air chamber 320. The compression- and extension side damping forces generated by the damping force generator 324 damp stretching vibration involved in absorption of the impact force by the suspension spring 323 and the air chamber 320.

The damper 100R includes a damping force adjusting rod 325 rotatably provided in the cap bolt 314. The damping force adjusting rod 325 adjusts the damping force by using a needle inserted into a hollow portion of the piston rod 316 to throttle a passage area of a bypass passage which bypasses the piston 318 and through which the upper and lower oil chambers 317A and 317B, located above and below the piston 318, are in communication with each other.

Thus, in the vehicle height control device 100, the left and right dampers 10L and 100R include the suspension springs 24 and 323, respectively. In this case, according to the present embodiment, the spring load on the suspension spring 24 provided in the one of the left and right dampers, that is, the damper 10L, is set higher than the spring load on the suspension spring 323 provided in the other of the left and right dampers, that is, the damper 10R.

The present embodiment exerts the following effects.

(a) The damper 10L has a configuration including "the wheel side tube 11 and the vehicle body side tube 12 slidably engaged; the damper cylinder 13 provided upright in the inner bottom portion of the wheel side tube 11; the piston rod 15 hanging from the upper end portion of the vehicle body side tube 12 and inserted into the oil chamber 17 in the damper cylinder 13, the oil chamber 17 being partitioned by the piston 16 provided at the leading end portion of the piston rod 15, into the upper oil chamber 17A above the piston 16 and the lower oil chamber 17B below the piston 16; and the oil reservoir chamber 18 defined outside the damper cylinder 13 and spanning to the upper portion of the vehicle body side tube 12, the oil reservoir chamber 18 having an upper portion that forms the air chamber 19". In connection with the configuration, the damper 10L includes the vehicle height control unit 100L including "the jack housing 111 of the hydraulic jack 110 provided at the upper end portion of the vehicle body side tube 12 such that the plunger 113 which defines the jack chamber 112 in the hydraulic jack 110 is fitted on the jack housing 111 of the hydraulic jack 110 so as to be movable up and down; the suspension spring 24 provided between the plunger 113 of the hydraulic jack 110 and the wheel side tube 11; the pump housing 121 provided in the upper end portion of the damper cylinder 13 and forming the pump chamber 122 in the hydraulic pump 120 such that the pump pipe 123 forming a part of the piston rod 15 and communicating with the oil chamber 17 in the damper cylinder 13 is slidably inserted into the pump chamber 122 in the pump housing 121; the selector valve 130 controlling the vehicle height by adjustment of the amount of hydraulic oil fed to the jack chamber 112 in the hydraulic jack 110 by the hydraulic pump 120 performing a pumping operation in conjunction with extending and contracting motion of the pump pipe 123 with respect to the pump housing 121; and the ECU 140 opening and closing the selector valve 130 in a controllable manner". Thus, the damper 10L provided with the vehicle height control unit 100L can be simply configured.

(b) The vehicle height control device has the detection unit 151 for detecting the height position of the plunger 113 of the hydraulic jack 110 and the ECU 140 that opens or closes the selector valve 130 in a controllable manner according to the result of the detection by the detection unit 151. Based on the result of the detection by the detection unit 151, the plunger 113 of the hydraulic jack 110 can be set to any height position, and thus the vehicle height can be adjusted to any height position.

(c) The selector valve 130 is provided at the upper end portion of the vehicle body side tube 12. The selector valve 130 formed of a solenoid or the like can be disposed at a sprung position above the suspension spring 24 where an input of vibration is small.

(d) The stoppage predicted time of the vehicle is predicted, and when the predicted stoppage predicted time is equal to or less than the predetermined reference stoppage time, the vehicle height reducing control mode is entered to switch the selector valve 130, thus enabling a vehicle height reducing operation. The vehicle height starts to be reduced during travel when the vehicle is about to stop. The vehicle height is completely reduced within a short time until the vehicle stops. This allows rider's feet to appropriately touch the ground, thus ensuring stability.

(e) The vehicle height control unit 100L is provided only in the one of the left and right dampers, that is, the damper 10L. This enables a reduction in the occupied space, weight, and costs of the vehicle height control device 100.

(f) The suspension springs 24 and 323 are provided in the left and right dampers 10L and 10R, respectively, and the spring load on the suspension spring 24 provided in the one of the left and right dampers, that is; the damper 10L, is set higher than the spring load on the suspension spring 323 provided in the other of the left and right dampers, that is, the damper 10R. This allows enhancement of the support capability of the suspension spring 24 for the damper 10L provided with the vehicle height control unit 100L.

The spring load on the suspension spring 24 provided in the one of the left and right dampers, that is, the damper 10L, can be increased by setting a spring constant for the suspension spring 24 larger than a spring constant for the suspension spring 224 provided in the other of the left and right dampers, that is, the damper 10R.

Figure 15:
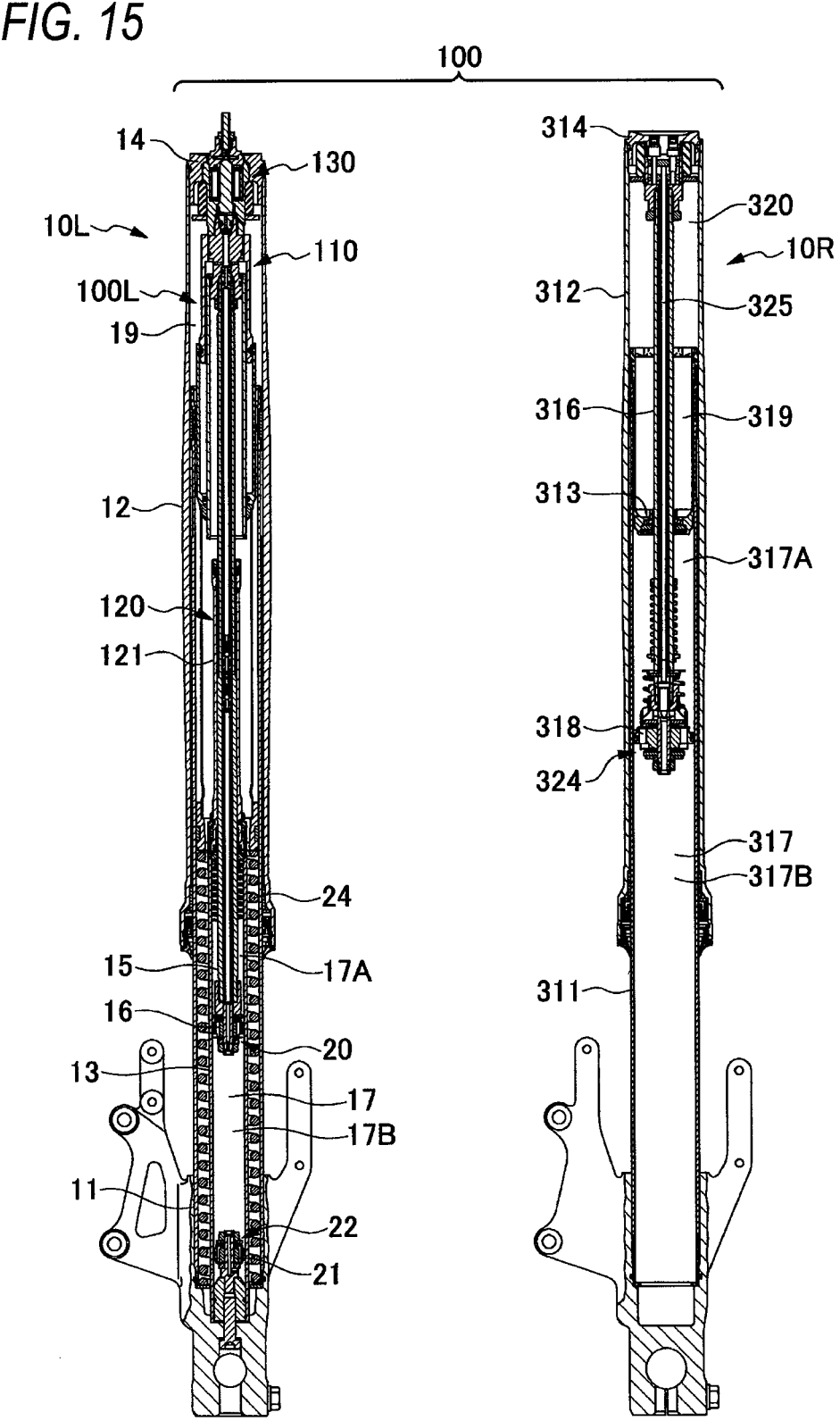
FIG. 15 is a cross-sectional view showing a left damper and a right damper included in a variation of the vehicle height control device.

FIG. 15 shows the vehicle height control device 100 according to a variation of the embodiment shown in FIG. 11. In this vehicle height control device 100, the suspension spring 24 is provided only in the one of the left and right dampers 10L and 10R, that is, the damper 100L. The suspension spring 323 is removed from the other of the left and right dampers, that is, the damper 10R, and no suspension spring is provided in the damper 10R.

At this time, the amount by which the plunger 113 of the hydraulic jack 110 provided in the one of the left and right dampers, that is, the damper 10L, elevates and lowers is equivalent to double the amount by which the plunger 113 of the hydraulic jack 110 elevates and lowers assuming a case that a vehicle height control unit similar to the vehicle height control unit 100L is also provided in the right damper 10R.

Thus, the vehicle height control device 100 exerts the following effects.

(a) The suspension spring 24 is provided only in the one of the left and right dampers, that is, the damper 10L. The suspension spring 323 is not provided in the other of the left and right dampers, that is, the damper 10R. Thus, the suspension spring 323 is not provided in the damper that is not provided with the vehicle height control unit 100L. This enables a reduction in the occupied space, weight, and costs of the vehicle height control device 100.

(b) The amount by which the hydraulic jack 110 provided in the one of the left and right dampers, that is, the damper 10L, elevates and lowers is equivalent to double the amount by which the hydraulic jack 110 elevates and lowers assuming a case that the vehicle height control units 100L are respectively provided in the left damper 10L and the right damper 10R. Thus, the spring load on the suspension spring 24 can be substantially doubled due to the deflection of the suspension spring 24 caused by the provision of the vehicle height control unit 100L and the suspension spring 24 only in the one of the dampers, that is, the damper 10L.

The embodiment of the present invention has been described in detail with reference to the drawings. However, the specific configuration of the present invention is not limited to the embodiment, but the present invention includes changes in design and the like made without departing from the spirits of the present invention. For example, in the vehicle height control device 100 with the vehicle height control unit 100L provided only in the one of the left and right dampers, that is, the damper 10L, the main damping force generator is provided in the other of the left and right dampers, that is, the damper 10R, and in the one of the left and right dampers, that is, the damper 10L, the damping force generator is not provided or only an auxiliary damping force generator is provided. Thus, the main damping force generator is provided in the damper 10R that is not provided with the vehicle height control unit 100L. In the damper 10L provided with the vehicle height control unit 100L, the damping force generator is not provided or only the auxiliary damping force generator is provided. Hence, the left and right dampers 10L and 10R can be balanced in weight.

Alternatively, according to the preset invention, the vehicle height control unit may be provided in both of the left and right dampers.

Furthermore, the present invention is similarly applicable to a lateral pair of dampers in a rear cushion.

INDUSTRIAL APPLICABILITY

The embodiment of the present invention provides a vehicle height control device for a motorcycle with a pair of dampers disposed on laterally opposite sides of a vehicle body, the vehicle height control device including a vehicle height control unit provided in at least one of the left and right dampers, wherein the damper provided with the vehicle height control unit includes a wheel side tube and a vehicle body side tube slidably engaged; a damper cylinder provided upright in an inner bottom portion of the wheel side tube; a piston rod hanging from an upper end portion of the vehicle body side tube and inserted into an oil chamber in the damper cylinder, the oil chamber being partitioned by a piston provided at a leading end portion of the piston rod, into an upper oil chamber above the piston and a lower oil chamber below the piston; an oil reservoir chamber defined outside the damper cylinder and spanning to an upper portion of the vehicle body side tube, the oil reservoir chamber having an upper portion that forms an air chamber; a jack housing of a hydraulic jack provided at an upper end portion of the vehicle body side tube such that a plunger which defines the jack chamber in a hydraulic jack is fitted on the jack housing of the hydraulic jack so as to be movable up and down; a suspension spring provided between the plunger of the hydraulic jack and the wheel side tube; a pump housing provided in an upper end portion of the damper cylinder and forming a pump chamber in a hydraulic pump such that a pump pipe forming a part of the piston rod and communicating with the oil chamber in the damper cylinder is slidably inserted into the pump chamber in the pump housing; a selector valve controlling a vehicle height by adjustment of an amount of hydraulic oil fed to the jack chamber in the hydraulic jack by a hydraulic pump performing a pumping operation in conjunction with extending and contracting motion of the pump pipe with respect to the pump housing; and control unit for opening and closing the selector valve in a controllable manner. Thus, the damper provided with the vehicle height control unit can be simply configured.

What is claimed is:

1. A vehicle height control device for a motorcycle with a pair of dampers disposed on laterally opposite sides of a vehicle body, the vehicle height control device comprising:
   a vehicle height control unit provided in at least one of the left and right dampers,
   wherein the damper provided with the vehicle height control unit comprises:
   a wheel side tube;
   a vehicle body side tube slidably engaged with the wheel side tube;
   a damper cylinder provided upright in an inner bottom portion of the wheel side tube;
   an oil chamber;
   a piston rod hanging from an upper end portion of the vehicle body side tube and inserted into the oil chamber in the damper cylinder;
   a piston provided at a leading end portion of the piston rod, the oil chamber being partitioned by the piston, into an upper oil chamber above the piston and a lower oil chamber below the piston; and
   an oil reservoir chamber defined outside the damper cylinder and spanning to an upper portion of the vehicle body side tube, the oil reservoir chamber having an upper portion that forms an air chamber, and
   wherein the vehicle height control unit comprises:
   a hydraulic jack including a jack housing and a plunger, the jack housing being provided at an upper end portion of the vehicle body side tube such that the plunger defining a jack chamber of the hydraulic jack is fitted on the jack housing so as to be movable up and down;
   a suspension spring provided between the plunger of the hydraulic jack and the wheel side tube;
   a hydraulic pump including a pump housing and a pump pipe, the pump housing being provided in an upper end portion of the damper cylinder and forming a pump chamber for the hydraulic pump such that the pump pipe forming a part of the piston rod and communicating with the oil chamber in the damper cylinder is slidably inserted into the pump chamber in the pump housing;
   a selector valve controlling a vehicle height by adjustment of an amount of hydraulic oil fed to the jack chamber in the hydraulic jack by the hydraulic pump that performs a pumping operation in conjunction with extending and contracting motion of the pump pipe with respect to the pump housing; and
   a control unit that opens or closes the selector valve in a controllable manner.

2. The vehicle height control device for the motorcycle according to claim 1, further comprising a detection unit that detects a height position of the plunger of the hydraulic jack, wherein the control unit opens or closes the selector valve in a controllable manner according to a result of the detection by the detection unit.

3. The vehicle height control device for the motorcycle according to claim 1, wherein the selector valve is provided at an upper end portion of the vehicle body side tube.

4. The vehicle height control device for the motorcycle according to claim 1, wherein the control unit predicts a stoppage predicted time of a vehicle, and when the predicted stoppage predicted time is equal to or less than a reference stoppage time, and the control unit enters a vehicle height reducing control mode to switch the selector valve, which enables a vehicle height reducing operation.

5. The vehicle height control device for the motorcycle according to claim 1, wherein the vehicle height control unit is provided only in one of the left and right dampers.

6. The vehicle height control device for the motorcycle according to claim 5, wherein a suspension spring is provided in the other of the left and right dampers, and a spring load on the suspension spring provided in the one of the left and right dampers is set higher than a spring load on the suspension spring provided in the other of the left and right dampers.

7. The vehicle height control device for the motorcycle according to claim 5, wherein a suspension spring is not provided in the other of the left and right dampers.

8. The vehicle height control device for the motorcycle according to claim 7, wherein an amount by which the hydraulic jack provided in the one of the left and right dampers elevates and lowers is equivalent to double an amount by which the hydraulic jack elevates and lowers assuming a case that vehicle height control units are respectively provided in both the left and right dampers.

9. The vehicle height control device for the motorcycle according to claim 5, wherein a main damping force generator is provided in the other of the left and right dampers, and in the one of the left and right dampers, the damping force generator is not provided or only an auxiliary damping force generator is provided.

10. The vehicle height control device for the motorcycle according to claim 1, wherein the hydraulic jack and the hydraulic pump are provided inside the vehicle body side tube.

11. The vehicle height control device for the motorcycle according to claim 1, wherein the oil reservoir chamber spans from a lower portion of the vehicle body side tube to the upper portion thereof.

12. The vehicle height control device for the motorcycle according to claim 1, wherein the oil reservoir chamber is defined on an outer periphery of the damper cylinder and spans from a lower portion of the vehicle body side tube to the upper portion thereof.

* * * * *